United States Patent [19]
Bamford et al.

[11] Patent Number: 5,470,190
[45] Date of Patent: * Nov. 28, 1995

[54] LOADER VEHICLE

[75] Inventors: Joseph C. Bamford, Territet, Switzerland; Frank Moeller, Milford, United Kingdom

[73] Assignee: Bamford Excavators, Limited, Staffordshire, United Kingdom

[*] Notice: The portion of the term of this patent subsequent to Aug. 31, 2010, has been disclaimed.

[21] Appl. No.: 92,113

[22] Filed: Jul. 14, 1993

Related U.S. Application Data

[63] Continuation-in-part of Ser. No. 978,466, Nov. 19, 1992, Pat. No. 5,240,366, which is a continuation of Ser. No. 657,648, Feb. 19, 1991, abandoned.

[30] Foreign Application Priority Data

| Feb. 21, 1990 | [GB] | United Kingdom | 9003852 |
|---|---|---|---|
| Feb. 21, 1990 | [GB] | United Kingdom | 9003853 |
| Feb. 21, 1990 | [GB] | United Kingdom | 9003854 |
| Feb. 21, 1990 | [GB] | United Kingdom | 9003920 |
| Jun. 8, 1993 | [GB] | United Kingdom | 9311770 |

[51] Int. Cl.[6] .................................................. E02F 3/34
[52] U.S. Cl. .................................... 414/686; 414/708
[58] Field of Search ............................. 414/686, 685, 414/697, 920, 700, 708; 212/260, 261, 255; 180/6.48, 89.12, 308

[56] References Cited

U.S. PATENT DOCUMENTS

| 2,755,944 | 7/1956 | Wetz | 214/131 |
|---|---|---|---|
| 3,131,493 | 5/1964 | LeTourneau | 37/124 |
| 3,154,164 | 10/1964 | Shaw et al. | 180/44 |
| 3,599,814 | 8/1971 | Brownfield | 180/22 |
| 4,122,960 | 10/1978 | Bauer et al. | 214/140 |
| 4,260,320 | 4/1981 | Steiger | 414/680 |
| 4,355,946 | 10/1982 | Wykhuis et al. | 414/707 |
| 4,705,449 | 11/1987 | Christianson | 414/68.5 |
| 5,169,278 | 12/1992 | Hoechst et al. | 414/685 |
| 5,240,366 | 8/1993 | Bamford | 414/686 |

FOREIGN PATENT DOCUMENTS

| 886945 | 4/1981 | Belgium . |
|---|---|---|
| 0258819 | 3/1988 | European Pat. Off. . |
| 3522723 | 1/1986 | Germany . |
| 390792 | 9/1960 | Switzerland . |
| 722517 | 12/1952 | United Kingdom . |
| 919660 | 2/1963 | United Kingdom . |
| 1130475 | 10/1968 | United Kingdom . |
| 1200176 | 7/1970 | United Kingdom . |
| 2044213 | 5/1978 | United Kingdom . |
| 1604597 | 12/1981 | United Kingdom . |
| 2150114 | 4/1983 | United Kingdom . |

*Primary Examiner*—Donald W. Underwood
*Attorney, Agent, or Firm*—Armstrong, Westerman, Hattori, McLeland & Naughton

[57] ABSTRACT

A loader vehicle comprising a body having a front end and a rear end and provided with ground engageable propulsion means, an operator's compartment and a boom assembly, comprising a lift arm assembly and a pivot member which projects transversely from the inner end of the lift arm assembly on one side thereof and extends transversely across the body from said one side of the lift arm assembly and which is pivotally mounted on the body, adjacent the rear end thereof, for movement of the lift arm assembly between a raised position and a lowered position in which the lift arm assembly extends forwardly alongside the operator's compartment and means for carrying a material handling implement at an outer end of the boom assembly so as to be disposed forward of the front end of the body, wherein the pivot member is pivotally mounted, for movement about a first axis, on a torsion member, which extends transversely across the body, by first pivotal mounting means disposed at positions which are spaced apart transversely of the torsion member and the torsion member is pivotally mounted on the body, for movement about a second axis which is parallel to the first axis and which extends transversely of the body, by second pivotal mounting means disposed at positions which are spaced apart transversely of the body.

35 Claims, 16 Drawing Sheets

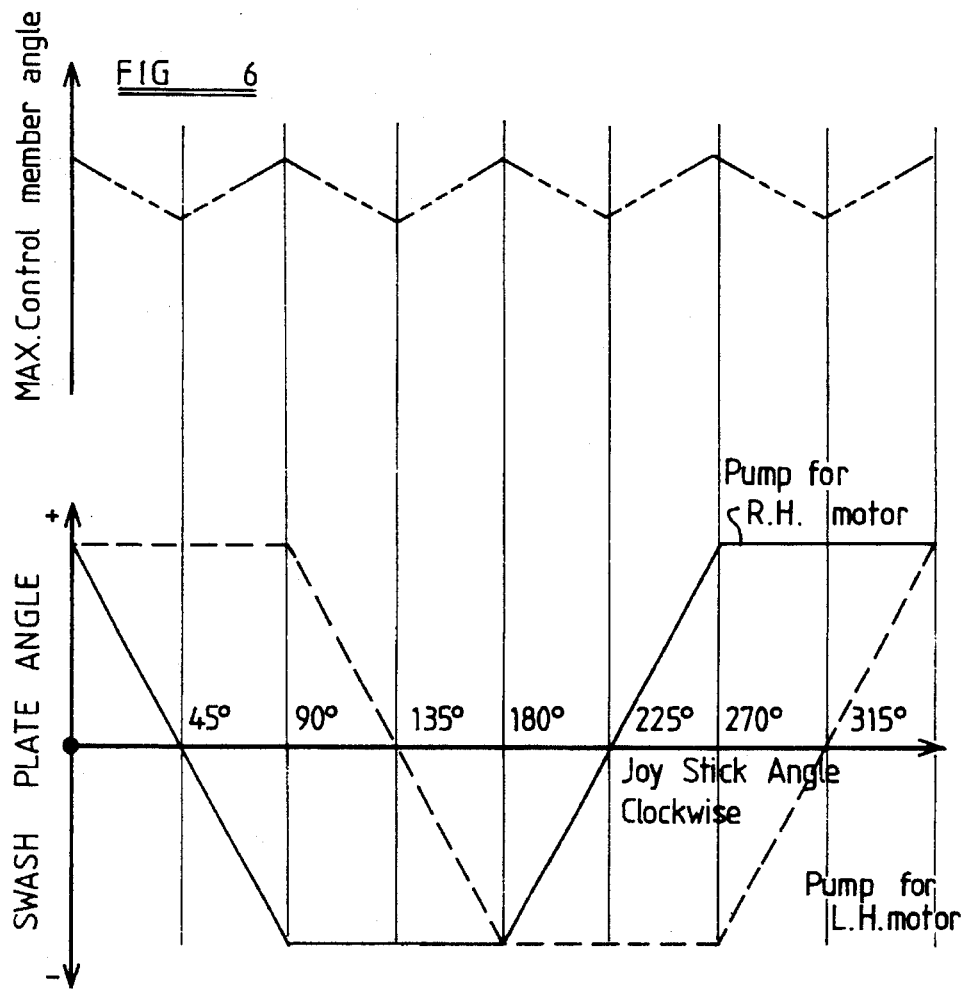
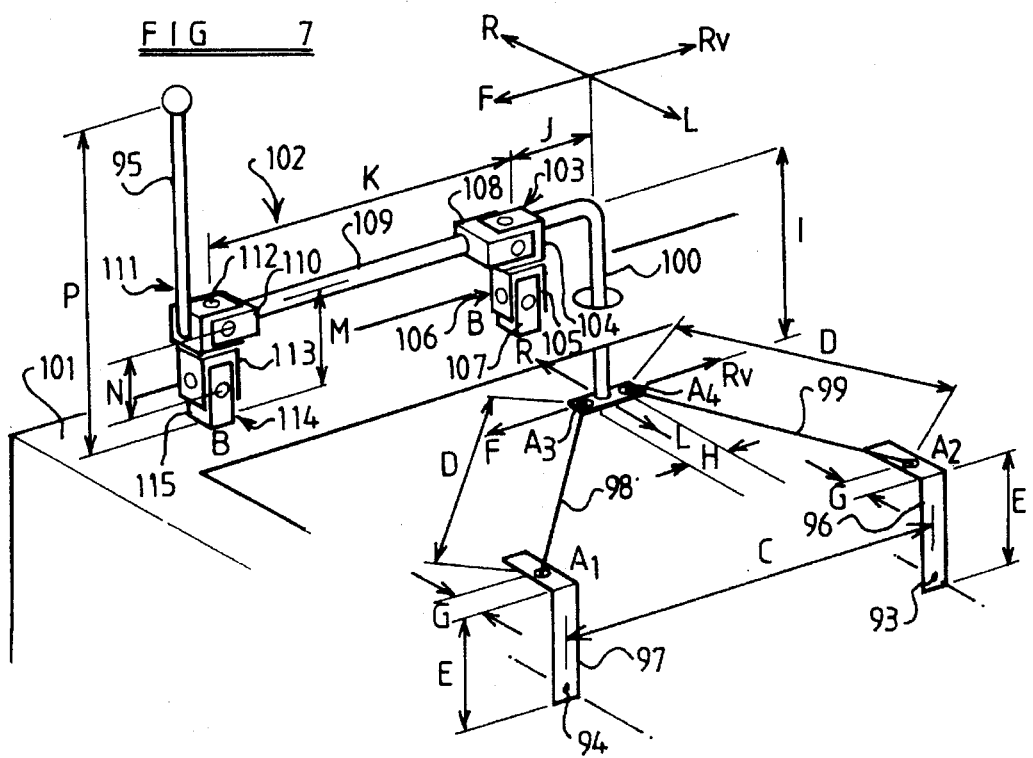

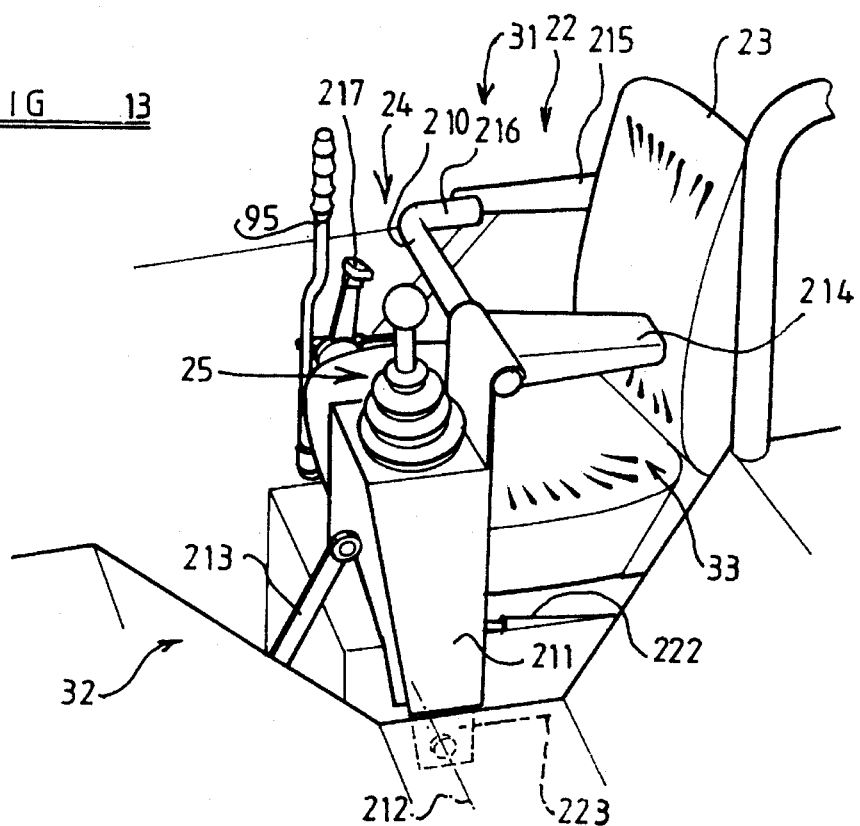
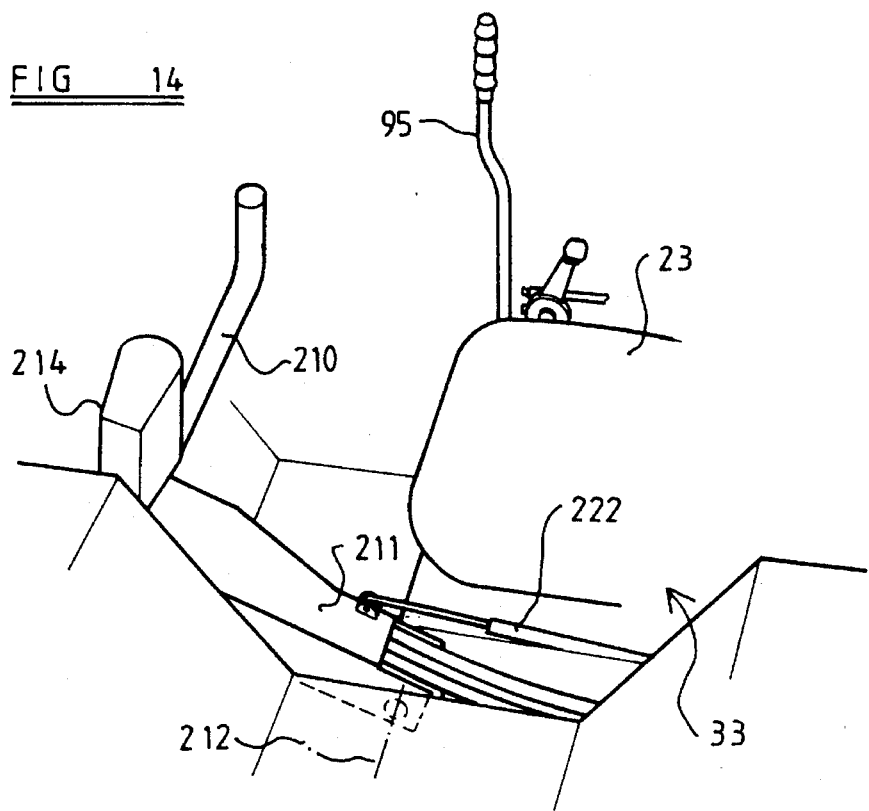

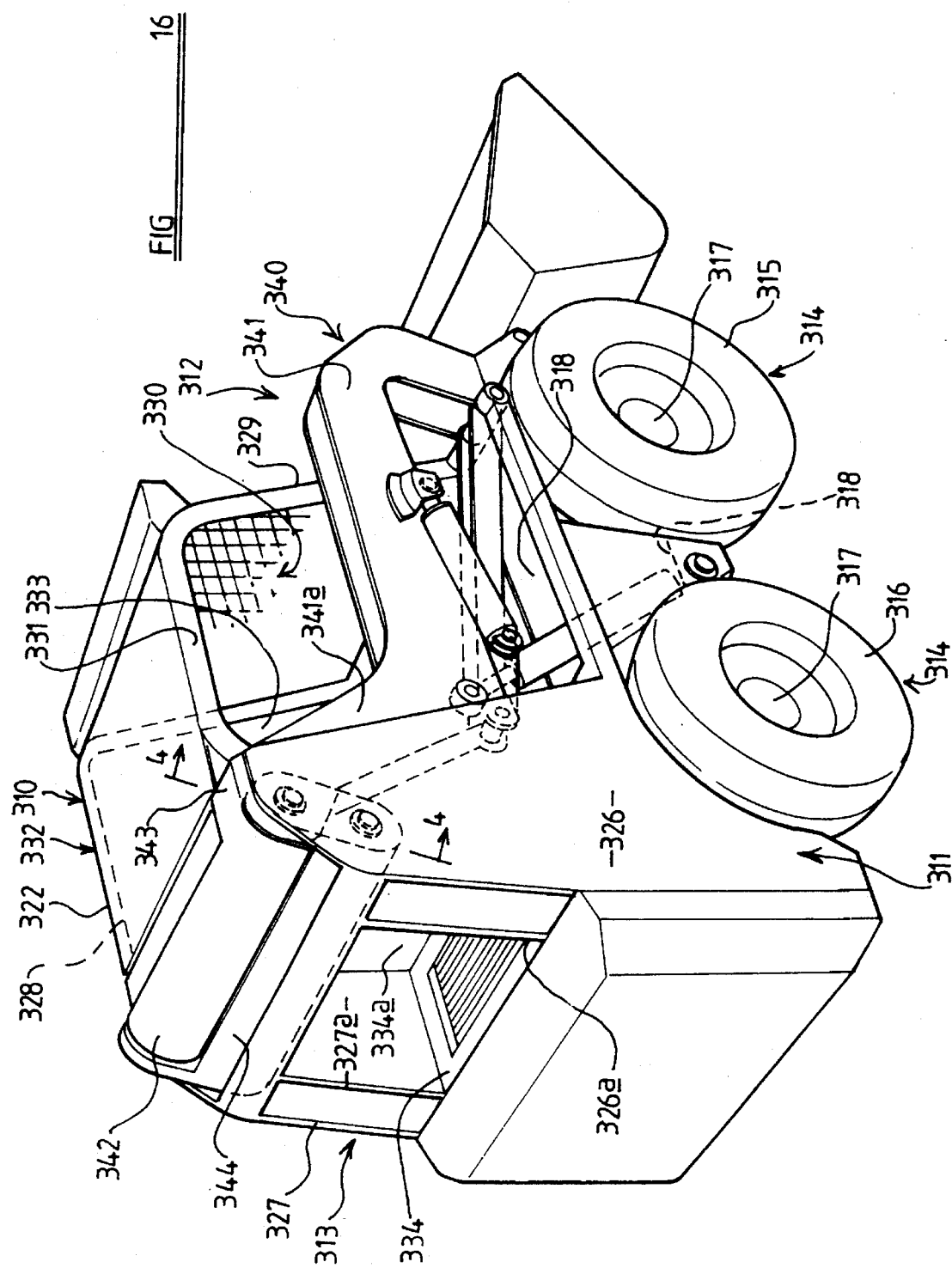

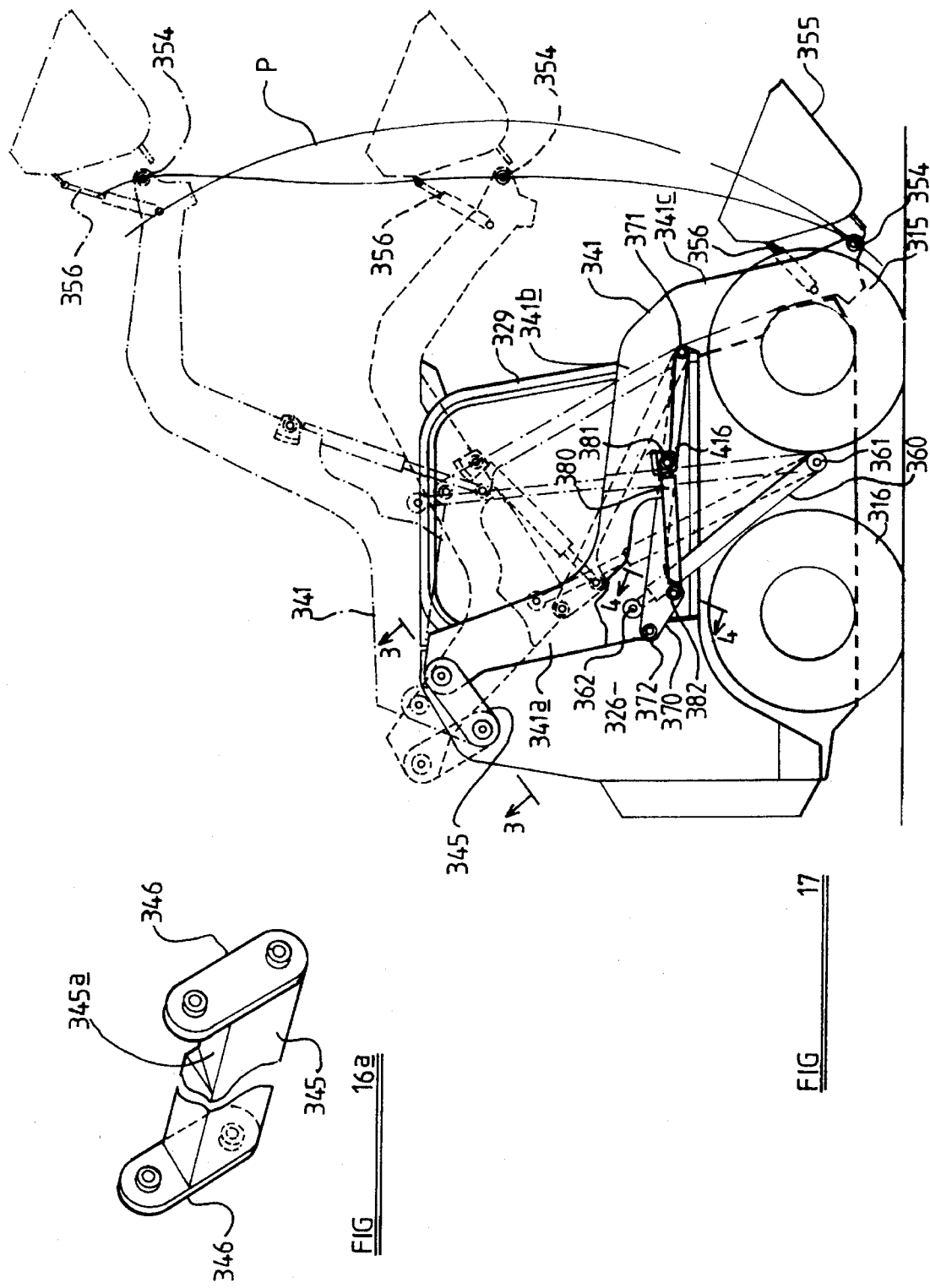

LOADER VEHICLE

This application is a continuation-in-part of application Ser. No. 07/978,466 filed Nov. 19, 1992 and now U.S. Pat. No. 5,240,366 which is a continuation of Ser. No. 07/657,648 filed Feb. 19, 1991, now abandoned.

BACKGROUND TO THE INVENTION

This invention relates to a loader vehicle, hereinafter referred to as "of the kind specified" comprising, a body having a front end and a rear end and provided with ground engageable propulsion means, an operator's compartment and a boom assembly which is pivotally mounted, at an inner end thereof, on the body, adjacent the rear end thereof, for movement between a raised position and a lowered position in which the boom assembly extends forwards alongside the operator's compartment and a material handling implement carried on an outer end of the boom assembly is disposed forward of the front end of the body.

An object of the invention is to provide a new and improved loader vehicle of the kind specified.

SUMMARY OF THE INVENTION

According to one aspect of the invention we provide a loader vehicle of the kind specified wherein the boom assembly comprises a lift arm assembly which extends forwards along one side only of the operator's compartment.

The lift arm assembly may comprise a pivot member which projects from the inner end of the lift arm assembly on one side thereof and extends transversely of the body on said one side of the lift arm assembly and is pivotally mounted on the body by pivotal mounting means disposed at positions which are spaced apart transversely of the body.

An access opening to the operator's compartment can conveniently be provided on the other side of the operator's compartment to that alongside which the lift arm assembly extends.

This is particularly convenient when the inner end of the boom assembly is pivotally mounted on the body adjacent an upper rear end part of the body so that, if present, a lift arm assembly would obstruct the access opening.

If desired the pivotal mounting means may comprise a pair of discrete mounting means or may comprise a single transversely extending elongate mounting means.

The lift arm assembly may comprise a single member or a plurality of members which extend(s) forwards along said one side only of the operator's compartment.

The lift arm assembly may have an implement carrying member which projects from the outer end of the lift arm assembly and extends transversely of the body and has said material handling implement carried thereon.

The body may be provided with an abutment means to support the implement carrying member against displacement in a direction rearwardly of the vehicle when the boom assembly is in a lower position.

The abutment means may be adapted to engage a part of or carried by the implement carrying member.

Preferably said abutment means is adapted to engage a roller rotatably mounted on the implement carrying member.

The abutment means may comprise an abutment surface provided at the front end of the side member disposed on the opposite side of the vehicle to the side on which the lifting arm assembly is disposed.

Said abutment surface may have a lower, generally upright part and an upper part which extends forwardly and upwardly.

The lift arm assembly may comprise a major rectilinearly extending part which extends from the inner end towards the outer end and a minor part which is inclined downwards relative to the major part and is disposed between the major part and said implement carrying member.

Said major and minor parts may be inter-connected by an intermediate part disposed therebetween and extending transversely inwardly from said major part to said minor part.

The lift arm assembly, including the pivot member and the implement carrying member may comprise a unitary component.

The unitary component may comprise a tubular member which may be of circular cross-section.

The unitary member may be made by bending from a single length of material.

The body may comprise a pair of transversely spaced side members on which said ground engageable propulsion means are mounted.

The ground engageable propulsion means may comprise wheels or tracks.

The ground engageable propulsion means may comprise a front wheel assembly disposed forwardly of a rear wheel assembly, at least one of said wheel assemblies may comprises a pair of wheels spaced apart transversely of the vehicle and at least one of said wheel assemblies being turnable about a steering axis to permit the vehicle to be steered.

Alternatively, the ground engageable transporter means may comprise a pair of wheel assemblies disposed on opposite sides of the vehicle and each pair comprising a front wheel disposed forwardly of a rear wheel and means to permit the vehicle to be propelled and steered by driving the wheels on one side of the vehicle at the same or a different speed and/or in a different direction from those on the other side of the vehicle.

Alternatively, the ground engageable transporter means may comprise a pair of endless tracks disposed one on one side and one on the other side of the vehicle and means to permit the vehicle to be propelled and steered by driving the track on one side of the vehicle at the same or a different speed and/or a different direction from the track on the other side of the vehicle.

A portion of the operator's compartment may be disposed between said side members.

The body may have a transmission compartment at least a portion of which is disposed between said side members and below the operator's cab and said transmission compartment housing a transmission to transmit drive from an engine of the vehicle to the ground engageable propulsion means.

The body may be provided with an engine compartment rearwardly of the operator's compartment and transmission compartment and said engine compartment housing the engine of the vehicle.

The mounting means may be supported by a pair of transversely spaced upright members disposed adjacent the rear of the body and which extend upwardly from said side members at the rear of the operator's compartment.

A part of said upright members may provide a part of the side walls of the operator's cab.

A part of the side members and of the upright members may be formed integrally with each other and the top wall of the operator's compartment may also be integrated therewith.

The side members may comprise loop case compartments comprising a transversely inner wall and a transversely outer wall joined by top and bottom walls and end walls and a member providing one of said walls, preferably the outer wall, may be provided integrally with the member which provides at least part of one plate, and preferably an inner plate, of each upstanding member.

The mounting means may be disposed on or adjacent a top rear part of the operator's compartment at a level whereby an operator can see horizontally rearwardly beneath the pivot member.

The boom assembly may comprise an implement levelling linkage to maintain the material handling implement in a fixed orientation relative to the body irrespective of raising and lowering of the lift arm assembly.

A pair of ground engageable propulsion means may be disposed on opposite sides of the vehicle whereby the vehicle can be propelled and steered by driving the propulsion means on one side of the vehicle at the same or different speed and/or direction from that on the other side and having a manually operable propulsion control means to control the direction in which, and the speed at which, the vehicle is propelled by the propulsion means and said propulsion control means is arranged and disposed so as to be operable by one hand of an operator.

Where the vehicle is a loader vehicle the vehicle may be provided with a loader control means to control raising and lowering of the boom assembly and movement of the material handling implement relative to the boom assembly, the loader control means being arranged and disposed so as to be operable by the other hand of the operator.

The propulsion control member may be operatively connected to said input members by a mechanical linkage.

Alternatively the propulsion control member may be operatively connected to said input members by a fluid pressure linkage.

Where the linkage is a fluid pressure linkage the input members may be provided with input levers which are connected to double acting fluid operated rams to which fluid is fed under the control of said loader control member.

Each fluid operated ram may be pivotally mounted to the body at a single location for pivotal movement about an axis parallel to the axis of rotation of the associated input member.

With the fluid pressure operated linkage the propulsion control member may comprise a universally mounted lever having a part spherical valve operating surface normal to the operating lever and there being four valve operating members engageable with said surface.

The valve operating members may be disposed at 45° to the drive direction of the vehicle and the propulsion control means may be provided with resilient biasing means so as normally to seek a median position with respect to a direction transverse to the fore and aft axis of the vehicle. Consequently, an operator feels less resistance to movement of the control member in a direction parallel to the fore and aft direction of the vehicle which, in use, provides forward or reverse drive, whilst any lateral component of movement of the propulsion control member encounters a stronger bias, therefore making the vehicle easier and safer to drive.

The biasing means may comprise a pair of resiliently biased plungers adapted to engage the operating surface on opposite sides of a central axis thereof and disposed on a line transverse to the fore and aft direction of the vehicle.

The valve operating members may themselves be resiliently biased into engagement with the operating surface and in this case the plungers have a stronger resilient bias than is provided to the valve operating members.

The above described hydraulic control enables operation of the input members from any desired location in the operator's compartment without the need to provide a route for a mechanical linkage and the above described single pivot of the two operating rams enables the hydraulic linkage to be simply and conveniently provided.

The invention is particularly concerned with a vehicle where the input members are the swash plate angle control members of hydrostatic pumps, the outputs of which are fed to hydrostatic motors which drive the ground engageable propulsion means.

At least one of said input members may be adapted to be engaged at a first position on one side of their axes of rotation and at a second position on the opposite side of their axis of rotation but facing in the same direction by a centring lever which is mounted on the body adjacent one end and urged in the direction towards the axis of pivot of the associated input lever so that said centring lever engages said input member at said positions when the input member is in a neutral position.

Preferably such a centring lever is provided for both input members and the centring levers are disposed so as to be urged in the direction towards the associated axis of pivot of the associated input member, for example, either by positioning the centring levers on the side of their respective input member which is remote from the other input member and inter-connecting the centring levers by resilient biasing means to pivot them in opposite directions to urge them towards their associated input member axes, or by positioning the centring levers on the side of their associated input member which is adjacent the other input member and resiliently biasing said centring levers apart.

Such an arrangement ensures that the input members are automatically centred and is applicable for any of the linkages described hereinbefore, i.e. the direct mechanical linkage or mechanical linkage with integral servo mechanism or fluid pressure linkage. It will be appreciated that the centring levers apply a centring or return pressure to the input members at all times when they are displaced from their neutral position. This ensures that the input members are returned to their neutral position in which the ground engageable propulsion means maintain the vehicle stationary when no input is provided to the propulsion control means. Accordingly, any risk of the vehicle moving when, for example, the engine is started without an operator in the operator's compartment is avoided.

From a second more specific aspect of the invention:

A restraint member may be mounted on the body for movement between an operative position in which the restraint member extends transversely of the operator's compartment in restraining relationship with the seat and an inoperative position in which passage of an operator into and out of the seat is permitted.

The restraint member may be carried on at least one lever which is pivotally mounted on the body.

The operator's compartment may be obstructed from access at one side thereof and is provided with an access opening at the other side thereof and a control means for a first function of the vehicle is mounted at said other side of the operator's compartment for movement between an operative position wherein it is presented for manual engagement by an operator sitting in said seat and an inoperative position spaced from said operative position to permit an operator to pass through said access opening.

A control means for a second function of the vehicle may be provided at said one side of the operator's compartment.

Said control means for the second function may be mounted on a fixed part of the body or may be mounted for movement between an operative position where it is presented for manual engagement by an operator sitting in said seat and an inoperative position spaced from said operative position.

The or each control means may be mounted for movement on a respective lever the or each of which is pivotally mounted on the body about an axis which extends transverse to the body for movement between a generally upright position when the respective control member is in said operative position and a generally forward position in which said respective control member is in said inoperative position.

The pivoted lever or levers of the invention may be arranged to operate means to apply a parking brake when in said inoperative position, for example, by a Bowden cable or rigid linkage and may as well or alternatively be provided with an interlock to the engine of the vehicle to prevent the engine to be started and run.

An interlock sensitive to the presence of an operator on the seat may be provided so that the engine can only be started when an operator is sitting in the seat.

One of said first and second functions may comprise a propulsion control means to control the direction in which, and the speed at which, the vehicle is propelled, whilst the other function may comprise a loader control means to control raising and lowering of the boom assembly for movement of the material handling implement relative to the boom assembly.

Preferably the loader control means comprises said control means for the first function of the vehicle and the propulsion control means comprises the control means for the second function of the vehicle.

Ground engageable propulsion wheels may be disposed on opposite sides of the body, each propulsion wheel being carried on an outer end of a stub axle which is housed, so as to be rotatable about an axis of rotation, in a stub axle housing member mounted on the body. An inner end of each stub axle may have a driven wheel thereon which is driven by a flexible loop from a driving wheel driven by a motor or the inner end of each stub axle may be driven by other means such as a separate motor for each stub axle.

Each stub axle housing member may be provided with a carrier member which is mountable on the body in a selected one of a plurality of angular positions about a reference axis, the stub axle housing member being positioned relative to the carrier member so that said axis of rotation is disposed eccentrically relative to said reference axis.

Preferably, the carrier member and the body are provided with co-operating guide means which guide the carrier member for rotation about said reference axis.

By virtue of said eccentric disposition of the axis of rotation, the distance between the driven wheel and the driving wheel may be adjusted thereby permitting adjustment of the wheel base, the ground clearance and the height of the centre of gravity of the machine; where the stub axles are driven by a flexible loop, a flexible loop of appropriate length is provided. In addition, a flexible loop of a given length may be tensioned.

The body may be provided with an engine, two pairs of ground engageable propulsion wheels disposed on opposite sides of the body, a hydraulic drive means including first and second variable displacement pumps driven by the engine and operatively connected to first and second hydraulic motors disposed on opposite sides of the body, each pump being drivably connected to two ground engageable propulsion wheels of an associated one of said pairs of wheels on the associated side of the body by first and second endless loops each of which is engaged with a driving wheel driven by the pump and with a driven wheel connected to an associated one of the ground engageable wheels of said pair and propulsion control means whereby the hydraulic drive means can drive the pair of wheels on one side of the vehicle at the same or a different speed and/direction from the pair of wheels on the other side of the vehicle to propel and steer the vehicle.

The body may be provided with a longitudinally extending loop case compartment on each side of the vehicle, each loop case compartment having a transversely inner wall and a transversely outer wall joined by top and bottom walls and end walls, said stub axle housing member or members being mounted on the outer wall with said driven wheel or wheels disposed within said compartment.

Preferably, two stub axle housing members are provided on each side of the vehicle and each of said housing members are mounted on said outer wall with said driven wheels disposed within the compartment with said driving wheels disposed within the compartment therebetween with said loops engaged with respective driving and driven wheels.

The outer wall may be provided with a circular opening for the or each housing member to provide one of said co-operating guide means.

Ground engageable propulsion wheels may be disposed on opposite sides of the body, each propulsion wheel being driven by a flexible loop from a driving wheel driven by a motor.

The driving wheel or wheels may be carried on an output shaft of a motor and are unsupported by means independent of the motor.

The body may be provided with a longitudinally extending loop case compartment on each side of the vehicle, each loop case compartment having a transversely inner wall and a transversely outer wall joined by top and bottom walls and end walls.

Each motor may be mounted on the inner or the outer wall of an associated loop case compartment with the driving wheel or wheels disposed within the associated loop case compartment.

The driving wheel or wheels are preferably carried on an output shaft of the associated motor and are unsupported by the other wall of the associated compartment.

The output shaft of each motor may be supported at an outer part thereof by an outer bearing carried by a bracket fastened to the respective motor body.

The bracket may be provided with openings to permit of passage of said loop or loops.

The driving wheel or wheels may be provided on a sleeve member which receives the output shaft of the associated motor therein at one end, an inner bearing being provided between the sleeve and the body of the motor.

Preferably, the outer bearing is provided between the bracket and said sleeve.

A brake member may be carried by the output shaft outwardly of said sleeve.

The outer wall of each loop case compartment may be provided with an opening in way of the motor and driving wheel or wheels to permit of manipulation of a loop into driving relationship with a driving wheel and driven wheel.

The brake member may be disposed outwardly of the part of the outer wall of the loop case compartment at locations spaced from said motor and a removable extension housing may be provided to enclose the brake member.

The or each endless loop may comprise a chain such as a roller chain and the driving and driven wheels may comprise sprockets for engagement with the chain.

Alternatively, the or each endless loop may comprise a toothed or untoothed belt and the driving and driven wheels appropriate pulleys.

The body may have a transmission compartment at least part of which is defined by and disposed between said side members and disposed below the operator's compartment and said transmission compartment may have a transmission to transmit drive from an engine of the vehicle to the ground engageable transporter means.

The body may be provided with an engine compartment, disposed rearwardly of the operator's cab and the transmission compartment, housing the engine of the vehicle.

The mounting means for said lift arm assembly may be supplied by a pair of transversely spaced upright members disposed adjacent the rear of the body and which extend upwardly from said side members at the rear of the operator's cab.

By virtue of providing the boom assembly as described hereinbefore, convenient access to the operator's compartment is provided from one side of the vehicle thereby avoiding the need of an operator to clamber over a material handling implement to gain access to the operator's compartment at the front.

By virtue of providing a transversely extending pivot member which is pivotally mounted to the body at transversely spaced positions relatively low bearing loads are provided. Half the number of fluid operated rams are required than would be required if the boom assembly comprised a pair of spaced parallel arms disposed on opposite sides of the operator's compartment and the loader arm is relatively simple to manufacture. Because the axis of pivot is disposed adjacent the rear of the vehicle and adjacent to the top of the operator's compartment a relatively large arc of movement of the material handling implement is achieved, thus providing a relatively large range of lift, whilst providing the vehicle with good reach and good stability.

Where the pivot member is directly pivotally mounted on the body by pivotal mounting means disposed at positions spaced apart transversely of the body, the material handling implement is moved in an arcuate path as the lift arm assembly is raised or lowered. This results in drawbacks such as when the implement is in a fully or nearly fully raised position it is vertically above or close to the front of the vehicle so that dumping of material from the implement into, for example, a truck, is difficult. Another drawback is a limitation on the shape of a vertical or substantially vertical excavation made by the vehicle. A further disadvantage is the change in the position of the centre of gravity of the vehicle as the loader arm assembly is raised and lowered which causes large variations in lifting ability to occur as well as rendering the vehicle susceptible to instability.

A further object of the invention is to provide a new and improved loader vehicle of the kind specified wherein the above mentioned drawbacks are overcome or are reduced.

According to a further aspect of the invention we provide a loader vehicle comprising a body having a front end and a rear end and provided with ground engageable propulsion means, an operator's compartment and a boom assembly, comprising a lift arm assembly and a pivot member which projects transversely from the inner end of the lift arm assembly on one side thereof and extends transversely across the body from said one side of the lift arm assembly and which is pivotally mounted on the body, adjacent the rear end thereof, for movement of the lift arm assembly between a raised position and a lowered position in which the lift arm assembly extends forwardly alongside the operator's compartment and means for carrying a material handling implement at an outer end of the boom assembly so as to be disposed forward of the front end of the body, wherein the pivot member is pivotally mounted, for movement about a first axis, on a torsion member, which extends transversely across the body, by first pivotal mounting means disposed at positions which are spaced apart transversely of the torsion member and the torsion member is pivotally mounted on the body, for movement about a second axis which is parallel to the first axis and which extends transversely of the body, by second pivotal mounting means disposed at positions which are spaced apart transversely of the body.

The vehicle may have a single operator's compartment which may be provided at a fixed location on the body.

The operator's compartment may comprise an enclosure.

The boom assembly may comprise a unitary generally L-shaped member comprising the lift arm assembly and the pivot member which projects from the inner end of the lift arm assembly on one side thereof and extends transversely across the body on said one side of the lift arm assembly to a position adjacent the opposite side of the body.

The pivot member may be a substantial member which is rigid with the lift arm assembly.

The torsion member may be pivotally mounted on the body by pivotal mounting means disposed at fixed positions which are spaced apart transversely of the body and are adjacent an upper rear end part of the body and are on opposite sides of the body.

The distance between the first and second axes of pivot may be substantially shorter than the length of the lift arm assembly.

A lifting means may be connected between the lift arm assembly and the body.

The lifting means may be connected at one end to the body at a position between the forward end and the rearward end of the ground engageable propulsion means and at its other end to the lift arm assembly at a position intermediate the forward end thereof and the pivot member so as to extend upwardly and rearwardly from the body to the lift arm assembly at least when the lift arm assembly is in a lowered position.

The lifting means may be a hydraulic ram.

A guide link may be connected between the body and the lift arm assembly to constrain the forward end of the lift arm assembly to move in a predetermined path that may be substantially vertical as the forward end is moved between a lowered and a raised position.

The guide link may have one end pivotally connected to the body adjacent the forward end of the body and a second end disposed rearwardly of the first end and pivotally connected to the lift arm assembly at a position between the forward end and the pivot member.

The guide link may be pivotally connected to the body at a position which is below the position which the torsion member is pivotally mounted on the body.

The guide link may be pivotally mounted on the body at a position above the position of connection of the lifting means to the body.

The guide link may extend from the position of pivotal connection of its first end to the body rearwardly and upwardly in all positions of the lift arm assembly.

When the lift arm assembly is in a lowered position the guide link may be disposed wholly below the position of pivotal connection of the torsion member to the body.

The pivotal connection of the lifting means to the body may be disposed at a position which is between the forward and rearward ends of the guide link when the lift arm assembly is in a lowered position and is preferably adjacent a position which is below the mid-point of the guide link.

The guide link may be longer than the distance between the axes of pivot of the torsion member to the body and the lift arm assembly to the torsion member.

The guide link may constrain the torsion member initially to pivot rearwardly as the forward end of the lift arm assembly is raised from a lowered position so that an included angle between a line joining the first and second axes of pivot and a line joining the first axis of pivot and the pivotal connection of the implement to the lift arm assembly decreases as the lift arm assembly is raised over a first portion of its range of movement and the second link then pivots forwardly so that said included angle increases as the lift arm assembly moves over a second portion of said range of movement.

The guide link may be connected to the lift arm assembly at a position which is disposed below a line joining the first axis of pivot member and the pivotal connection of the implement to the lift arm assembly.

The lift arm assembly may comprise a first part which extends generally downwardly from the first axis of pivot, a second part which extends forwardly generally horizontally from the lower end of the first part, and a third part which extends downwardly from the forward end of the second part.

The guide link may be connected to the lift arm assembly in the region where the first and second parts of the lift arm assembly meet.

The lifting means may also be connected to the lift arm assembly in said region.

The position of connection of the guide link to the lift arm assembly may be disposed below a line joining the position of pivotal connection of the forward end of the guide link to the body and the first pivotal axis when the lift arm assembly is in a lowered position and may move to a position above said line as the lift arm assembly is moved to its uppermost position.

The guide link may be substantially horizontal when the lift arm assembly is in its lowermost position.

The boom assembly may comprise an implement levelling ram means hydraulically connected to an implement crowd ram means to maintain the material handling implement in a fixed orientation relative to the body irrespective of raising and lowering of the lift arm assembly.

The implement levelling ramp means may have a first end connected to the lift arm assembly and extend rearwardly therefrom to have a second end connected to the guide link at a position adjacent to and spaced from the pivotal connection of the guide link to the lift arm assembly.

When the lift arm assembly is in its lowermost position the implement levelling ramp means may extend substantially horizontally.

The position of pivotal connection of the second end may be disposed slightly below the position of pivotal connection of the first end when the lift arm assembly is in its lowermost position and the position of pivotal connection of the second end may be disposed below and forwardly of the position of pivotal connection of the second end of the guide link to the lift arm assembly.

The guide link may comprise a pair of spaced parallel guide link elements and the lifting means may be disposed so as to extend between the elements.

The implement levelling ram means may be disposed on the outer side of the lifting means and may be pivotally connected to an outer one of said pair of link elements.

An access opening to the operator's compartment can conveniently be provided on the other side of the operator's compartment to that alongside which the lift arm assembly extends.

The body may comprise a pair of transversely spaced side members on which the ground engageable propulsion means are mounted, said mounting means are supported by a pair of transversely spaced upright members disposed adjacent the rear of the body and which extend upwardly from said side members at the rear of, and on opposite sides of the operator's compartment, the mounting means being disposed at a top rear-part of the operator's compartment and there being an opening in the compartment below the pivot member whereby an operator can see horizontally rearwardly beneath the pivot member.

If desired the pivotal mounting means may comprise a pair of discrete mounting means or may comprise a single transversely extending elongate mounting means.

The lift arm assembly may comprise a single member or a plurality of members which extend(s) forwards along said one side only of the operator's compartment.

The lift arm assembly may have an implement carrying member which projects from the outer end of the lift arm assembly and extends transversely in front of the body and has said material handling implement carried thereon.

The body may be provided with an abutment means adapted to engage the implement carrying member to support the implement carrying member against displacement in a direction rearwardly of the vehicle when the boom assembly is in a lower position.

The abutment means may comprise an abutment surface provided at the front end of the side member disposed on the opposite side of the vehicle to the side on which the lifting arm assembly is disposed.

The lift arm assembly, including the pivot member and the implement carrying member may comprise a unitary component.

The body may comprise a pair of transversely spaced side members on which said ground engageable propulsion means are mounted.

The ground engageable propulsion means may comprise wheels or tracks.

The ground engageable propulsion means may comprise a front wheel assembly disposed forwardly of a rear wheel assembly, at least one of said wheel assemblies may comprises a pair of wheels spaced apart transversely of the vehicle and at least one of said wheel assemblies being turnable about a steering axis to permit the vehicle to be steered.

Alternatively, the ground engageable transporter means may comprise a pair of wheel assemblies disposed on opposite sides of the vehicle and each pair comprising a front wheel disposed forwardly of a rear wheel and means to permit the vehicle to be propelled and steered by driving the wheels on one side of the vehicle at the same or a different speed and/or in a different direction of rotation from those on the other side of the vehicle.

Alternatively, the ground engageable transporter means may comprise a pair of endless tracks disposed one on one side and one on the other side of the vehicle and means to permit the vehicle to be propelled and steered by driving the track on one side of the vehicle at the same or a different speed and/or a different direction from the track on the other side of the vehicle.

A portion of the operator's compartment may be disposed between said side members.

The body may have a transmission compartment at least a portion of which is disposed between said side members and below the operator's cab and said transmission compartment housing a transmission to transmit drive from an engine of the vehicle to the ground engageable propulsion means.

The body may be provided with an engine compartment rearwardly of the operator's compartment and transmission compartment and said engine compartment housing the engine of the vehicle.

The mounting means may be supported by a pair of transversely spaced upright members disposed adjacent the rear of the body and which extend upwardly from said side members at the rear of the operator's compartment.

A part of said upright members may provide a part of the side walls of the operator's cab.

A part of the side members and of the upright members may be formed integrally with each other and the top wall of the operator's compartment may also be integrated therewith.

The side members may comprise loop case compartments comprising a transversely inner wall and a transversely outer wall joined by top and bottom walls and end walls and a member providing one of said walls, preferably the outer wall, may be provided integrally with the member which provides at least part of one plate, and preferably an inner plate, of each upstanding member.

The mounting means and torsion member may be disposed on or adjacent a top rear part of the operator's compartment at a level whereby an operator can see horizontally rearwardly beneath the torsion member.

BRIEF DESCRIPTION OF THE DRAWINGS

Embodiments of the invention will now be described by way of example with reference to the accompanying drawings wherein:

FIG. 6 is a graphical representation of the swash plate angle control member regime for different propulsion control member positions, FIG. 7 is a diagrammatic illustration of a mechanical linkage for use in the vehicle of FIG. 1.

FIG. 13 is a fragmentary perspective view showing part of the operator's compartment of the vehicle of FIG. 1, FIG. 14 is another perspective view of part of the operator's compartment shown in FIG. 13 but taken from a different viewpoint, FIG. 16 is a perspective view of a further skid steer loader vehicle embodying the invention, FIG. 16a is a fragmentary perspective view of a torsion member of the vehicle of FIG. 1, FIG. 17 is a side elevation of the vehicle of FIG. 1 showing the boom assembly in a different position.

DESCRIPTION OF THE PREFERRED EMBODIMENTS

General Layout

Figures 1, 1A:
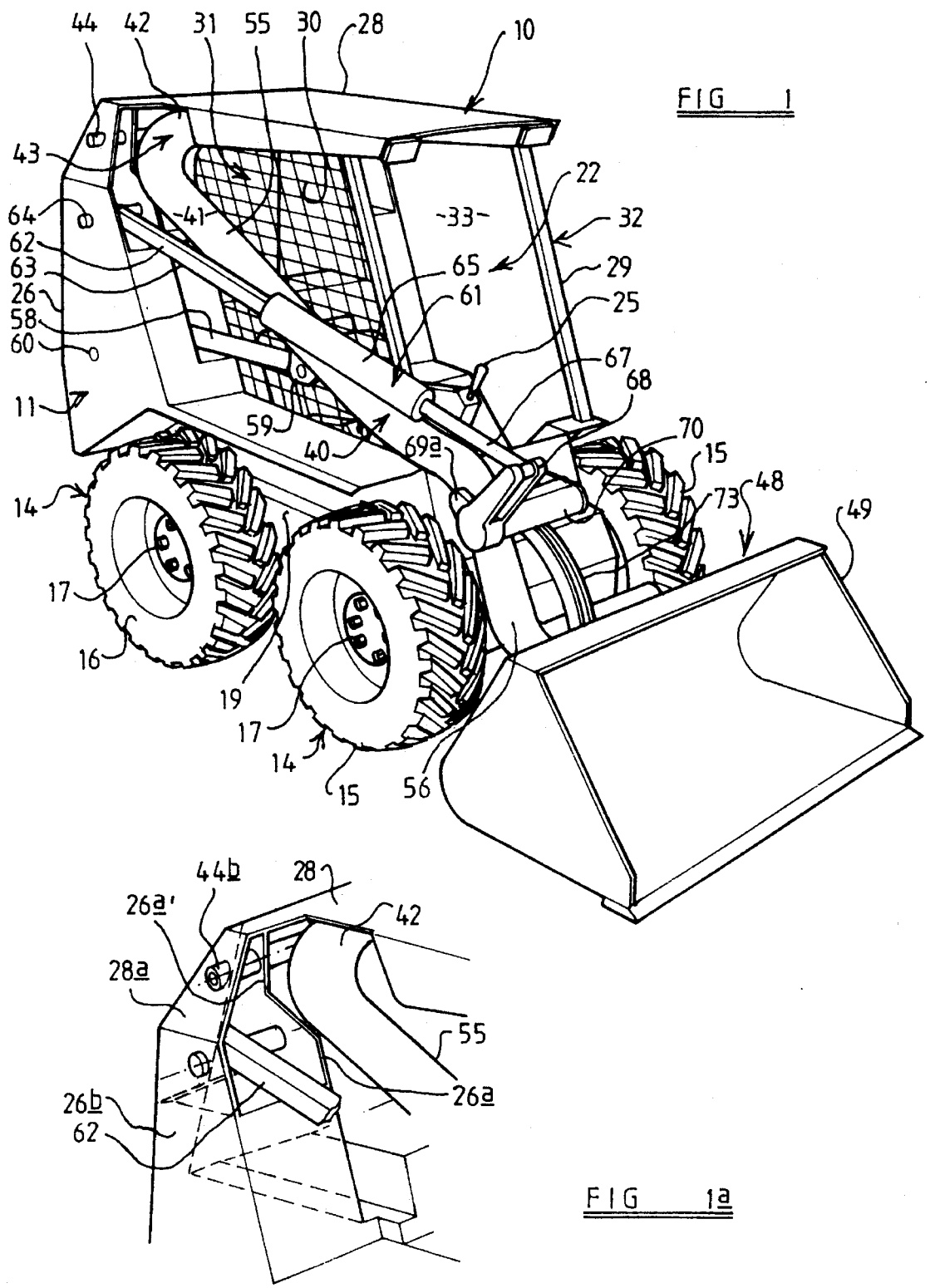
FIG. 1 is a perspective view of a skid steer loader vehicle embodying the invention.
FIG. 1a is an enlarged fragmentary view of part of FIG. 1 to an enlarged scale.

Referring now to the drawings, a skid steer loader vehicle 10 comprises a body 11 having a front end 12 and a rear end 13. The body 11 is provided with ground engageable propulsion means 14 comprising a pair of front wheels 15 disposed forwardly of a pair of rear wheels 16. The vehicle 10 is propelled in a straight line forwardly or rearwardly by driving all four wheels or, to steer the vehicle, by driving the wheels 15 and 16 on one side at a different speed and/or direction than those on the other side. Such skid steer loaders have a high degree of manoeuvrability and to facilitate skid steering and in particular, for example, the ability of the vehicle to turn about a central axis of the ground engageable propulsion means the wheel base is made, in the present example, slightly shorter than the track of the vehicle although, if desired, the wheel base may be the same or longer than the track if desired.

The wheels 15, 16 are carried on stub axles 17 which project outwardly from a pair of transversely spaced side members 18, 19 of the body 10 and which extend fore and aft of the vehicle. Between the side members 18, 19 is a transmission compartment 20 which houses a transmission 21, hereinafter to be described in more detail, whilst above and forwardly of the transmission compartment 20 is an operator's compartment 22 in which is provided an operator's seat 23, manually operable propulsion controls 24 for controlling the speed, selecting forward and reverse movement, and steering the vehicle and manually operable loader controls 25 for controlling a loader arm and material handling implement as hereinafter to be described.

The operator's compartment 22 is also defined by a pair of upstanding members 26, 27 which extend upwardly from the side members, 18, 19 on opposite sides of the vehicle and by a roof 28 which extends forwardly and adjacent its forward end is supported by posts 29.

A wire mesh screen 30 is provided on one side 31, of the operator's compartment 22 for protection of an operator, whilst the other side, 32 of the operator's compartment is unobstructed and provides an access opening 33 whereby an operator can enter and leave the operator's compartment 22.

Behind the transmission compartment 20 and operator's compartment 22 is provided an engine compartment 34 in which an engine 35 of any suitable type is housed. In the present example the engine is an air-cooled diesel engine but any other suitable engine may be provided.

Loader Boom Assembly

The vehicle is provided with a loader arm boom assembly 40 which is disposed adjacent the one side 31 of the operator's compartment 22. The loader arm assembly 40 comprises a lift arm assembly 41 which has a pivot member 42 projecting from an inner end 43 of the lift arm assembly 41 and extends transversely of the body and is pivotally mounted on the body by pivotal mounting means 44, 45 provided on the upstanding members 26, 27 respectively. The lifting arm assembly 41 has an implement carrying member 46 which projects from an outer end 47 of the lifting arm assembly and extends transversely across the front end of the body and has a material handling implement 48 carried thereby so as to be disposed forward of the front end 12 of the body 11. In the present example the implement 48 is an earth moving bucket 49 although if desired other material handling implements may be provided, such as forks.

The pivotal mounting means comprise a pivot boss 44a welded in an aperture provided in an inner plate 27a of the upstanding member 27 and a pivot pin 45 is fixed therein. At its other end the pivot pin 45 is fixed in a further pivot boss 44b which is welded in an aperture in an inner plate 26a of the upright 26 and a downwardly inclined part 28a of the roof plate 28.

At its free end the pivot member 42 has a bearing housing 42a welded therein and the housing 42a carries a bush to rotatably mount the pivot member 42 on the pivot pin 45. At its other end the pivot member 42 has a further bearing housing 42b in the form of a bush welded in an opening formed in the pivot member 42 where it merges into a major part 55 of the lift arm assembly 41 and the bearing housing 42b again houses a suitable bearing bush to pivotally mount the pivot member 42 on the pivot pin 45. The inner plate 26a is cut away in this region, as shown at 26a' in FIG. 1a, to accommodate the boom assembly.

Figure 4:
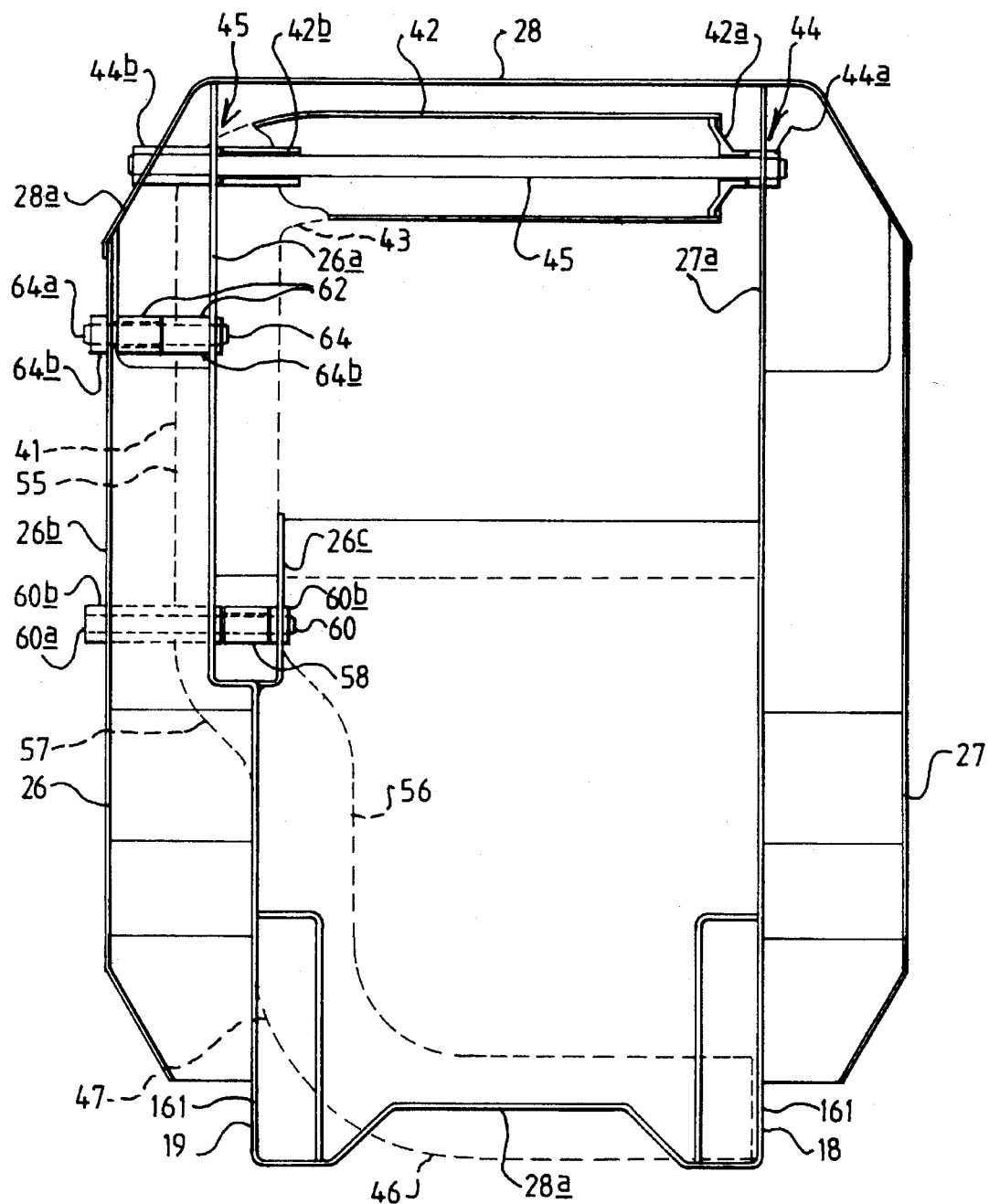
FIG. 4 is a section on the line 4—4 of FIG. 2.
Figure 5:
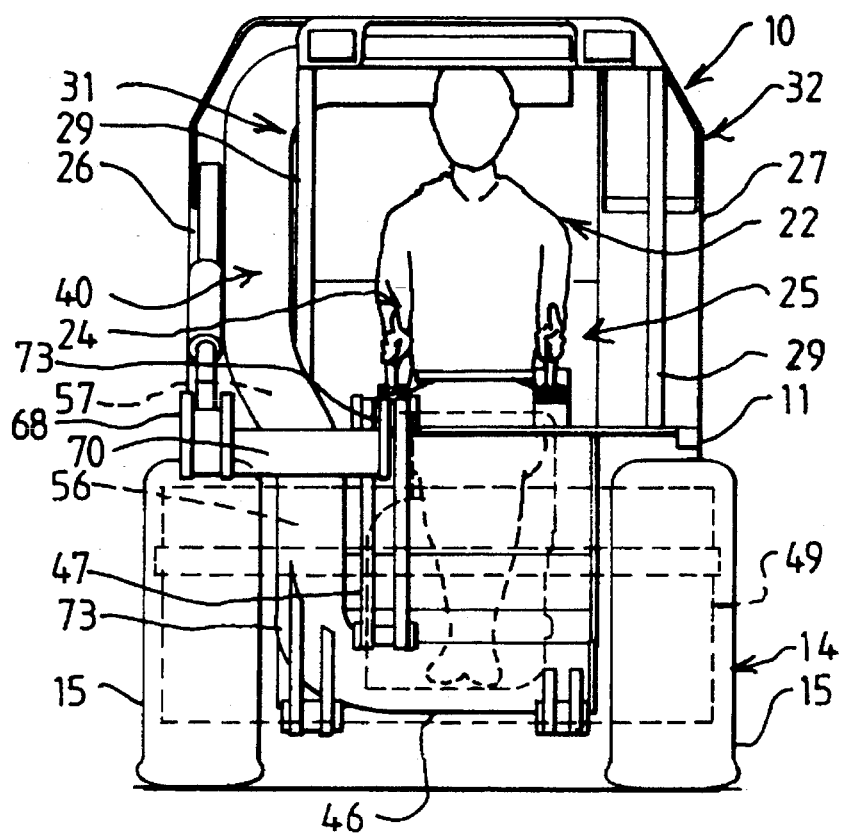
FIG. 5 is a front elevation of the vehicle of FIG. 1 with part omitted for clarity.

The lift arm assembly 41, pivot member 42 and implement carrying member 46 are formed as a unitary member by bending a steel tube to the desired shape. It will be seen that the lift arm assembly 41 comprises a major part 55 which extends generally rectilinearly from the inner end 43 towards the outer end 47 and a minor part 56 which extends generally downwardly and forwardly relative to the main part 55 and is disposed between the main part 55 and the implement carrying member 46. As best shown in FIGS. 4 and 5 an intermediate part 57 is provided between the main and minor parts 55, 56 which is inclined forwardly and transversely inwardly so as to position the minor part 56 within the front wheels 15 and in front of the operator's compartment 22.

A hydraulic lift ram 58 is pivotally connected between a bracket 59 welded to the lift arm assembly 41 and the upstanding member 26 about an axis indicated at 60. The pivotal connection of the lift ram 58 to the upright 26 at the axis 60 comprises a pivot pin 60a which is fixed in pivot bushes 60b welded in openings provided in the inner plate 26a, and an outer plate 26b and a further plate 26c of the upstanding member 26. The cylinder of the ram 58 is pivotally mounted on the pivot pin 60a. The lift ram 58 when actuated is adapted to raise and lower the lift arm assembly 41 between a lower position shown in FIGS. 1 to 4 in full line and a raised position shown in chain dotted line in FIG. 2.

An implement levelling link is indicated generally at 61 and comprises a first link 62 which comprises a bar 63 pivotally connected to the upstanding member 26 about an axis 64 and connected to a ram 65 from a cylinder 66 of which a piston rod 67 projects forwardly and is pivotally connected to one end of a first lever 68. The pivotal connection of the first link 61 comprises a pivot pin 64a fixed in pivot bushes 64b welded in apertures in the inner and outer members 26a, 26b respectively whilst the bar 63 is pivotally mounted on the pivot pin 64a.

The first lever 68 is pivotally mounted on the lift arm assembly 41 by a pivot member 69 carried by a bracket 69a mounted on the lift own assembly 41 and is connected by a torque tube 70 to a second lever 71 which is pivotally connected at its outer end 72 to a second, fixed length link 73 which is pivotally connected to the bucket 49 as shown at 74.

The respective positions of the axis of pivot of the lift arm assembly 41 provided by the pivot pin 45 and the connection of the implement levelling link to the upstanding member 26 at axis 64 together with the length of the first and second levers 68, 71 and the position of pivotal connection of the second link 73 to the bucket 49 at 74 together with the position of pivotal connection of the bucket 49 to the implement carrying member 46 at 75 is arranged so as to provide a linkage which ensures that the orientation of the bucket 49 relative to the body is preserved irrespective of the angular position of the lift arm assembly 41 so long as relative movement does not occur between the piston rod 67 and cylinder 66.

Figure 2:
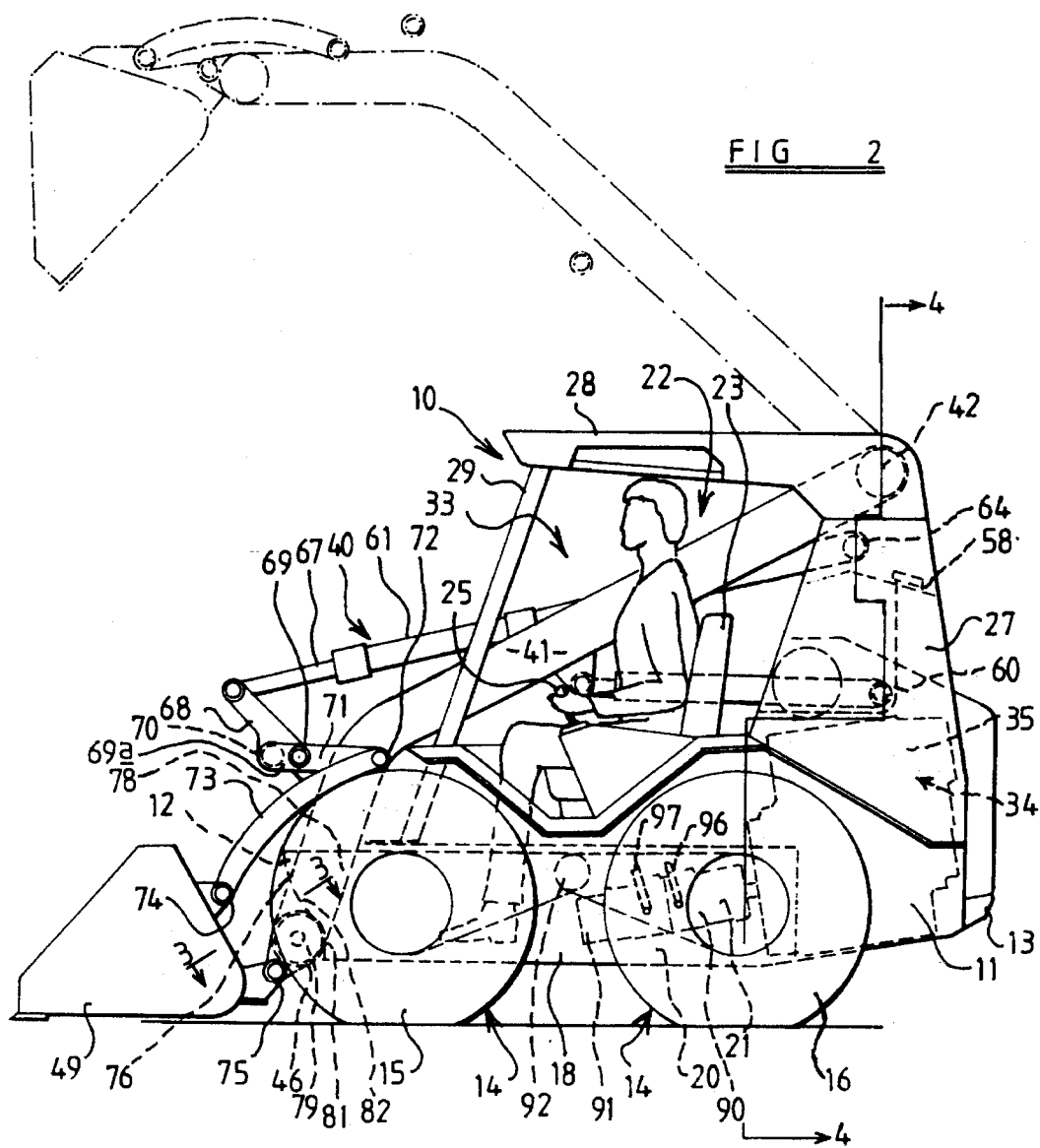
FIG. 2 is a side elevation of the vehicle of FIG. 1 and showing the opposite side thereof to that shown in FIG. 1.
Figure 3:
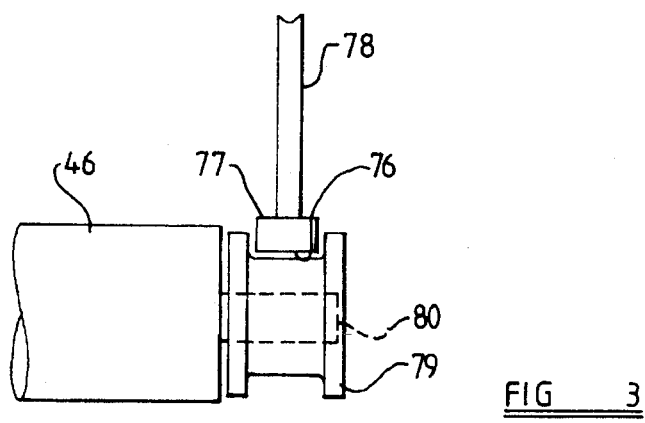
FIG. 3 is a section on the line 3—3 of FIG. 2.

When it is desired to pivot the bucket upwardly, i.e. cause it to rotate about the axis 75 in a clockwise direction as viewed in FIG. 2, fluid is supplied to the cylinder 65 to act on the larger diameter side of the piston therein so as to force the piston rod 67 out of the cylinder 65 so that the above described linkage causes the desired clockwise movement of the bucket 49. Such movement is generally required in operation to lift or tear out earth and hence is known as "tear out" movement. Because the fluid is operative upon the whole cross-sectional area of the piston a relatively high power action is provided in this direction.

When it is desired to rotate the bucket in an anti-clockwise direction as shown in FIG. 2, commonly known as "dumping" then fluid is supplied to act on an annular surface of the piston surrounding the piston rod 67 so that a smaller cross-sectional area is acted upon and therefore a faster, although less powerful action, is provided.

At the front end 12 of the side member 18 there is provided an abutment surface 76 provided by a bar 77 welded to a cam plate extension 78 of the side member 18. The bar 77 is adapted to abut a flanged roller 79 rotatably mounted on a spigot 80 projecting from the free end of the implement carrying member 46. The abutment surface 76 comprises a lower, generally vertical surface part 81 and a forwardly and upwardly inclined part 82, the surface parts 81 and 82 being contoured to co-operate with the roller 79 as the lift arm assembly 41 approaches its lowermost position and to prevent rearward displacement of the free end of the implement carrying member 46 when in such a lower position, for example, when driving a vehicle forwardly to load the bucket 49. If desired the abutment surface 76 may be extended upwardly so as to support the member 46 over a greater height.

From the foregoing it will be seen that boom assembly 40 extends forwardly from a position adjacent the rear end of the body 11 alongside the one side 31 of the operator's compartment 22 whilst the other side 32 is unobstructed so that an operator can gain access to the compartment through the access opening 33.

By providing the axis of pivot of the lift arm assembly 41 adjacent the top rear corner of the operator's compartment the operator is provided with the ability to lift the bucket to a relatively great height and at the same time provide the bucket with good reach and the vehicle with a stability. For example, the axis of pivot of the lift arm assembly is approximately 1.5 m above the ground in the example illustrated, whilst the distance between the axis of pivot of the lift arm assembly and the axis of pivot of the bucket about the axle 75 is approximately 2.5 m. Hence the vehicle has a total lift of approximately 3 m and over the whole of this range of lift the pivotal connection 75 to the bucket lies forwardly of the front end 12 of the vehicle.

Propulsion and Loader Controls

The transmission 21 comprises a pair of conventional swash plate hydrostatic pumps 90, 91 the output of which is sent, in conventional manner, to a conventional hydrostatic motor 92. In this example the rearmost pump 90 provides a feed to the motor 92 on the left-hand side of the vehicle whilst pump 91 provides feed to the corresponding pump, not shown, on the right-hand side of the vehicle.

The pumps 90, 91 each have an input member 93, 94 respectively which are rotatable about spaced parallel axes which extend perpendicular to a fore and aft axis of the vehicle and which lie in a substantially horizontal plane.

The input members 93, 94, in the present example, control the angle of the swash plates of their associated hydraulic pump through the intermediary of a hydraulic servo mechanism in-built into the hydraulic pump in conventional manner. If desired, however, the input members 93, 94 may directly mechanically actuate the angle of the swash plates again in conventional manner.

The vehicle is provided with a suitable linkage to connect the manually operable propulsion control means 24 to the input members 93, 94 in order to achieve a desired regime of swash plate angle control. Such a regime is illustrated in FIG. 6 which shows the desired swash plate angle and hence desired input member 93, 94 positioned for different positions of propulsion control member angular position. The graphical representation of FIG. 6 assumes that the propulsion control member 95 is, in each angular position moved to fullest extent possible but the same pattern of swash plate control would be achieved for lesser amounts of movement in any particular direction although the extent of movement of the swash plates of each pump would be correspondingly reduced.

When the control member 95 is moved to its fully forward position, i.e. parallel to the fore and aft direction of the vehicle (referred to in FIG. 6 as 0°) both input members 93, 94 are rotated, in the example illustrated, in a clockwise direction as viewed in FIG. 2 or FIG. 7 so as to cause forward movement of both the left-hand and right-hand propulsion means.

When the lever is moved 45° to the right (referred to in FIG. 6 as 45°) the linkage causes the input member 94 to adopt a position at which the swash plates deliver no fluid to the motor, i.e. a neutral position, whilst the input member 93 of the swash plate which drives the left-hand motor 92 is maintained in its fully forward position so that the vehicle is caused to turn to the right.

Movement of the member 95 in a direction at 90° to the right (referred to in FIG. 6 as 90°) causes the input member 94 to move to signal the swash plates to move fully to a reverse drive position whilst the input member 93 is maintained in its fully forward position and hence the vehicle is caused to turn on its axis.

Movement of the control member 95 to a position 135° to the right causes the input member 94 to be maintained in its full reverse position whilst the input member 93 is moved to a neutral position in which no output is produced by the swash plates.

When the lever 95 is moved in a reverse direction parallel to the fore and aft axis of the vehicle, (referred to in FIG. 6 as 180°) the input member 94 is maintained in its full reverse position whilst the input member 93 is moved to a full reverse position.

A similar sequence of movements occurs when the lever 95 is moved to corresponding positions to the left, referred to in FIG. 6 as 225°, 270° and 315°.

A mechanical linkage which aims to provide the above described regime is illustrated in FIG. 7. Each input member 93, 94 is provided with an input lever 96, 97 respectively and these levers are connected by ball joints at positions A1, A2 to respective links 98, 99 which are connected by ball joints at A3, A4 to the lower end of an operating lever 100. The points A1, A2, A3, A4 all lie in a plane which is parallel to and spaced above a plane which contains the axes of rotation of the input members 93, 94.

The operating lever 100 is pivotally mounted to a part 101 of the body 11 for universal movement by virtue of a parallelogram linkage 102. The linkage 102 comprises a first Hookes joint 103, one yoke 104 of which is fixed to the top end of the operating lever 100 and is also fixed to one yoke 105 of a second Hookes joint 106, the other yoke 107 of which is fixed to the part 101 of the body. The second yoke 108 of the first Hookes joint 103 is connected by a link 109 to a first yoke 110 of a third Hookes joint 111, the second yoke 112 of which is connected to a first yoke 113 of a fourth Hookes joint 114, the second yoke 115 of which is fixed to the part 101 of the body. In addition, the second yoke of the third hooks joint 111 carries the propulsion control member 95. Thus movement of the control member 95 in any one of the radial directions described hereinbefore permitted by the fourth Hookes joint 114 will be transmitted by the link 109 and Hookes joint assembly 103, 106 to the operating lever 100. The line joining the points B of connection of the Hookes joints 106 and 114 to the part 101 of the body lies parallel to a line joining the parts A1, A2 but in a plane spaced above the plane containing the parts A1–A4.

Hence movement of the propulsion control member 95 in, for example, the forward direction F parallel to the fore and aft axis of the vehicle will cause a corresponding movement of the points A3, A4 in the reverse direction Rv which will cause the input members 93, 94 to rotate in a clockwise direction to provide an output to the pumps to cause the vehicle to advance forwardly. Similarly, movement of the control member 95 in the reverse direction Rv will cause movement of the points A3, A4 in the forward direction F and the corresponding anti-clockwise rotation of each of the input members 93, 94 to provide reverse movement of the vehicle.

Movement of the lever 95 in the direction R, i.e. to the right of the vehicle at right-angles to the fore and aft axis, causes movement of the points A3, A4 to the left to cause the input member 93 to rotate in a clockwise direction so that the left-hand ground engageable propulsion unit is driven forwardly whilst the input member 94 is rotated in an anti-clockwise direction to cause the right-hand ground engageable propulsion unit to rotate in a reverse direction, thereby causing the vehicle to spin on its axis.

If the member 95 is moved to the left in the direction of the arrow L, then the points A3, A4 are moved to the right in the direction of the arrow R thus causing the member 93 to rotate anti-clockwise to cause the left-hand propulsion unit to provide reverse drive whilst the input member 94 is caused to rotate clockwise so that the right-hand propulsion unit is caused to rotate forwards, again causing the vehicle to rotate on its axis but in the reverse direction, i.e. to the left.

Movement of the lever 95 at 45° to any one of the directions described hereinbefore causes a combination of motions to take place. For example, if the control lever 95 is moved 45° to the right, i.e. midway between the forward and right-hand positions illustrated in FIG. 7, then there will be a corresponding movement of the points A3 and A4 at 45° midway between the Rv and L directions shown in FIG. 7 having the effect of maintaining the input member 94 in its neutral position so that no drive is provided to the right-hand ground engageable propulsion means whilst the input member 93 is moved fully clockwise to provide full forward drive to the left-hand propulsion means, thereby causing the vehicle to steer to the right. A corresponding combination of motions occurs for movement of the lever 95 at other 45° angles and at other positions a combination of motions of the control members 93, 94 is obtained substantially in accordance with FIG. 6.

In one particular example the dimensions of the linkage are as follows, although it will, of course, be appreciated that other dimensions may be provided as will be apparent to a person of skill in the art.

| Dimension | mm |
| --- | --- |
| C | 240 |
| D | 150 |
| E | 100 |
| G | 50 |
| H | 30 |
| I | 180 |
| J | 45 |
| K | 305 |
| M | 90 |
| N | 50 |
| P | 440 |

The control force ratio between sideways movement of the control member 95 and the forward and reverse movement can be varied by altering the length of the links 98, 99 which, in the illustrated example are 150 mm long, which with a distance between the points A1, A2 in the neutral position of the pumps of 240 mm gives a 45° angle between the links 98, 99 and the line joining the points A1, A2. By making the links longer the force required for sideways movement of the member 95 will be greater and the extent of sideways travel smaller and would give the control member 95 a bias towards straight line travel.

Figure 8:
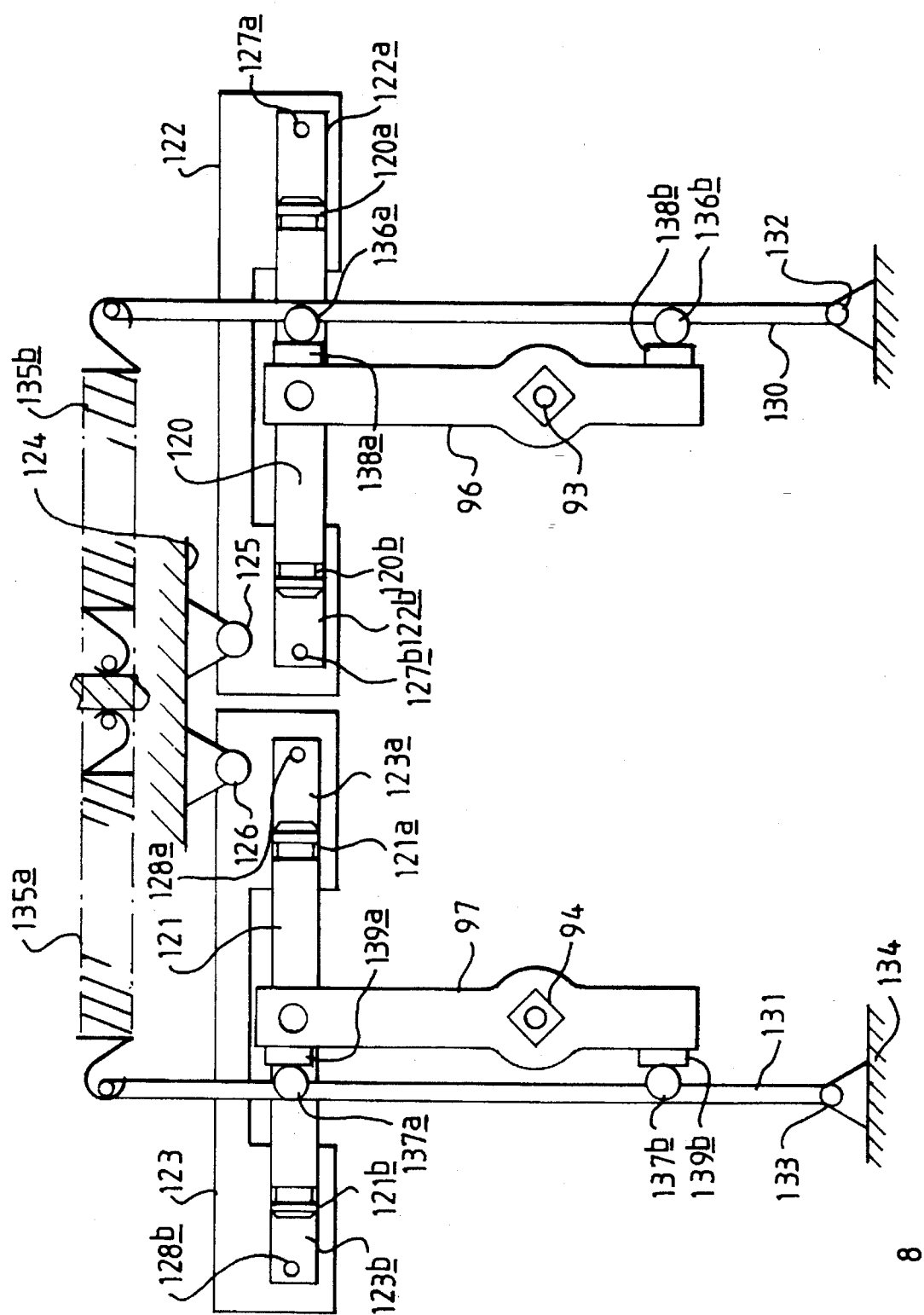
FIG. 8 shows part of a hydraulic linkage for use in the vehicle of FIG. 1.

FIG. 8 illustrates an alternative hydraulic linkage in which the hydrostatic pumps and motors are as described in connection with the FIG. 7 embodiment and the input members 93, 94 again have input levers 96, 97 respectively. However, the levers 96, 97 are connected to piston rods 120, 121 of double acting hydraulic rams 122, 123 respectively. The hydraulic rams 122, 123 are pivotally mounted to a part 124 of the body 11 about vertical axes 125, 126 respectively which are parallel to the axis of rotation of the input members 93, 94.

The piston rods 120, 121 are provided with piston heads 120a, 120b; 121a, 121b respectively and the rams 122 are provided with corresponding cylinders 122a, 122b: 123a, 123b respectively which are provided with inlet ports 127a, 127b: 128a, 128b respectively.

Each input lever 96, 97 is associated with a centring lever 130, 131 respectively which are pivotally mounted as shown at 132, 133 to a fixed part 134 of the body 11.

The centring levers 130, 131 are pivotally biased together by coil tensions springs 135a, 135b and carry balls 136a, 136b; 137a, 137b respectively which engage abutment parts 138a, 138b; 139a, 139b respectively of the input levers 96, 97. If desired, instead of two springs a single spring interconnecting the levers 130, 131 may be provided. The pivots 132, 133 are positioned so that when the input members 93, 94 are in their neutral positions so that the swash plates are providing no output the abutment portions 138a, 138b: 139a, 139b are each engaged by their associated ball 136a, 136b: 137a, 137b of the associated centring lever 130, 131 so that the input members 93, 94 are biased towards their neutral position from any displacement in either direction therefrom and hence are normally maintained in their neutral position in the absence of any input. It should be appreciated that the above described centring means may be equally applied to the mechanical linkage described with reference to FIG. 7 but has not been illustrated in FIG. 7 for clarity.

Figure 9A:
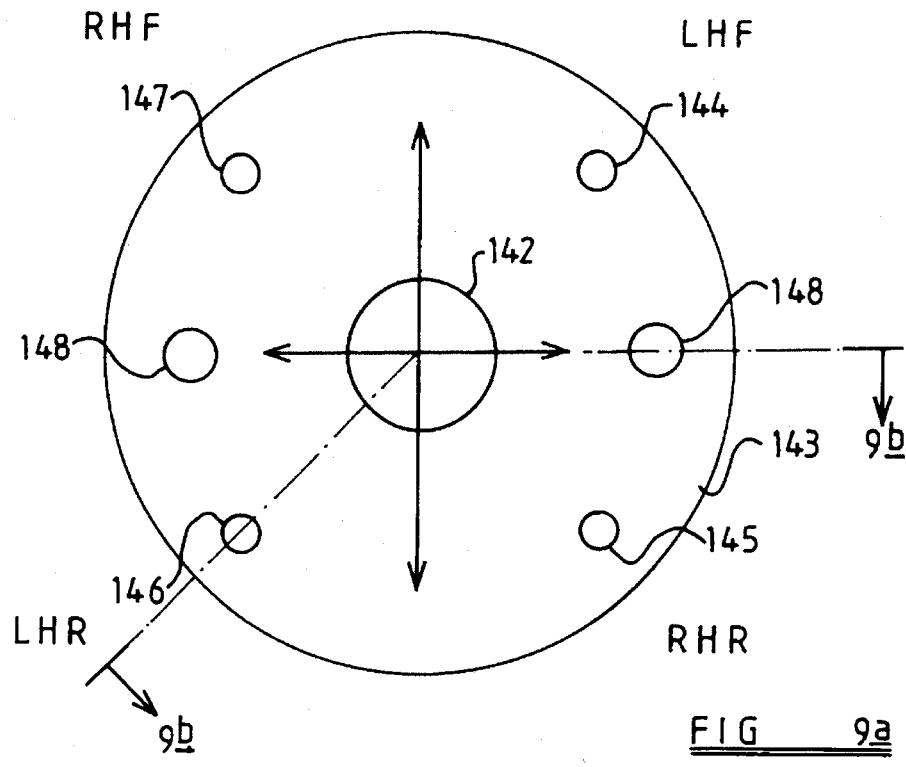
FIG. 9a is a diagrammatic plan view of a propulsion control lever for use with the linkage of FIG. 8.
Figure 9B:
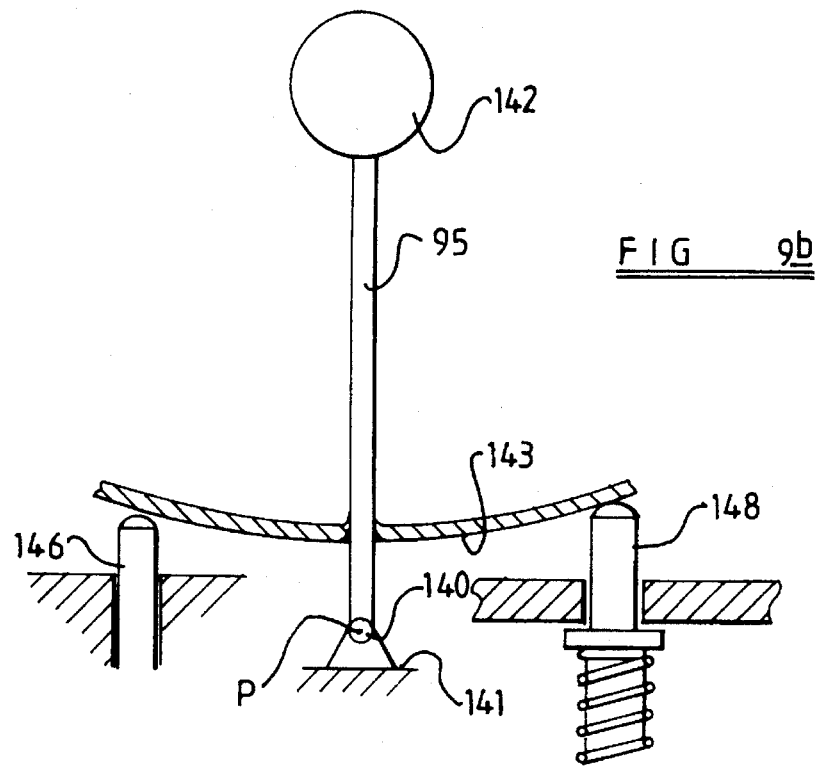
FIG. 9b is a diagrammatic cross-section on the line 9b–9b of FIG. 9a, and FIG. 10 is a diagrammatic illustration of an alternative form of mechanical linkage utilising flexible cables.

Referring now to FIGS. 9a and 9b, the propulsion control member 95 is universally mounted about a point P by a suitable universal joint 140 to a base part 141 which, in the present example, is fixed relative to the body 11.

At its upper end the control member 95 has a knob 142 which can be grasped by the operator.

Adjacent the lower end of the member 95 is a valve operating surface member 143 which provides a part spherical valve operating surface which is engaged by valve operating plungers 144–147 which are disposed at equal distances from the universal joint 140 and on planes containing the point of pivot of the joint 140 and are equally angularly spaced therearound lying in planes inclined at 45° to a line through the joint 140 and parallel to the fore and aft axes of the vehicle.

The plungers 144–147 are spring biased into engagement with the surface member 143 and, in themselves, would tend to bias the member 95 into a vertically upward position as shown in FIG. 9 with an equal bias to return the member 95 to the neutral position when displaced therefrom in any direction.

In order to provide a bias towards movement of the control member 95 in a forward and reverse direction two further spring bias plunger members are provided as illustrated at 148 and disposed on opposite sides of the universal joint 40 on a line perpendicular to the fore and aft axis of the vehicle. The spring bias provided by the plungers 148 is significantly stronger than that provided by the plungers 144 thus a stronger bias to return the member 95 to the vertical occurs when the member 95 is displaced from the vertical to the left or the right than when it is displaced from the vertical in a forward or reverse direction. This provides the vehicle with a bias towards forward and reverse movement of the member 95 with stronger operator force being required to cause steering movement of the vehicle to the left or the right thereby facilitating forward or reverse driving of the vehicle and in addition making the vehicle safer.

The valve operated by the plunger 144 is arranged to feed hydraulic fluid under pressure when the plunger 144 is depressed to the port 127b of the ram 122 to cause the input member 93 to rotate clockwise to provide forward drive to the left-hand propulsion unit. Similarly, the plunger 147 is arranged to cause its associated valve to feed fluid to the port 128b of the ram 123 to cause the input member 94 to operate the right-hand propulsion unit in a forward direction.

Depression of the plunger 145 causes its associated valve to feed fluid to the port 128a of the ram 123 to cause the member 94 to rotate in an anti-clockwise direction and to cause the right-hand unit to drive in reverse, whilst depression of the valve member 146 causes its associated valve to feed fluid under pressure to the port 127a of the ram 122 to cause the member 93 to rotate anti-clockwise to cause the left-hand unit to drive in reverse.

When the member 95 is moved to the right plungers 144 and 145 are depressed causing forward movement of the left-hand unit and reverse movement of the right-hand unit so that the vehicle spins on its axis to the right. Similarly, movement of the member 95 to the left depresses the plungers 146 and 147 to cause the left-hand unit to rotate in reverse and the right-hand unit to operate forward to cause the vehicle to spin on its axis in a left-hand direction.

When the lever 95 is moved at 45°, for example, at 45° between the forward and right directions, the valve 144 only is depressed so that the left-hand unit is caused to drive forward whilst the right-hand unit remains at its neutral position since neither of its operating plungers 145 or 146 are depressed. A similar depression of only one plunger occurs at each of the 45° positions with associated movement only of one of the propulsion units in accordance with the regime of FIG. 6. Movement of the control member 95 to positions intermediate the 45° positions described hereinbefore causes a combination of movements in accordance with the valve members which are depressed and their extent of depression.

In the above described hydraulic linkage system the maximum displacement possible of the propulsion control member 95 in terms of its angular rotation about a horizontal axis passing through the point P varies in accordance with whichever of the various directions in which it is displaced. For example, when the control member 95 is moved in a forwards direction so that the valve operating members 144 and 147 are displaced downwardly, then for a given extent of valve operating member displacement the control member 95 will move forwardly further than would be the case if it were moved, for example, at 45° to the right so that only the valve member 144 were displaced downwardly. This is because the radial distance of the line of action of the valve operating members 144, 147 is closer to the axis of pivot of the member 95 than is the valve operating member 144, thus the control member 95 is moved to a greater extent in each of the forward, reverse and left and right positions compared with intermediate positions at 45° therebetween and the upper line in FIG. 6 illustrates this.

A similar differential in the extent of control member movement occurs with both the rigid mechanical linkage described above and the flexible mechanical linkage now be described.

Figure 10:
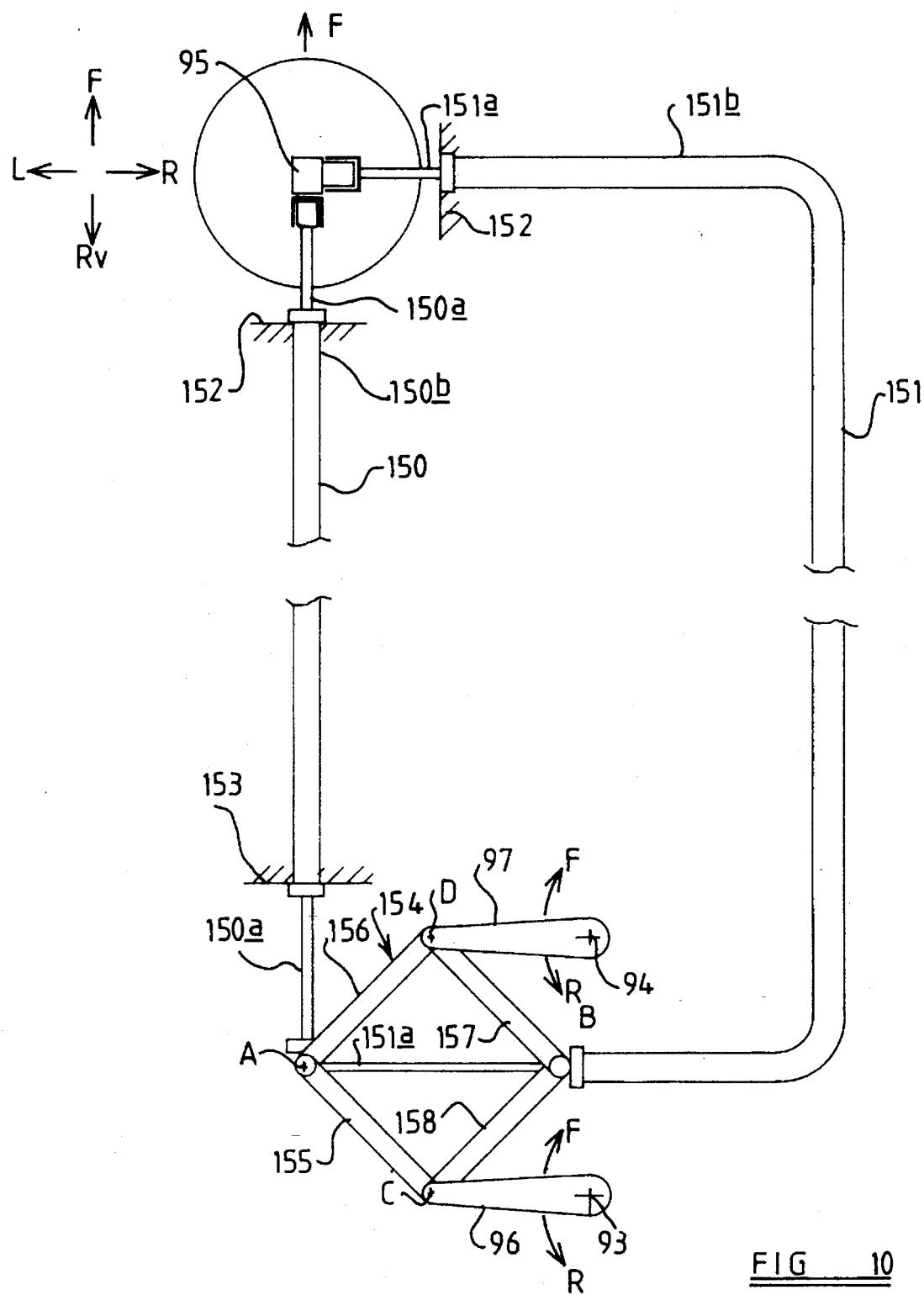

Referring now to FIG. 10, there is shown an alternative mechanical linkage utilising a pair of flexible push-pull cables 150, 151. An inner member 150a of the cable 150 is connected to the propulsion control member 95 so that forward movement, F, of the member 95 pulls the inner member 150a out of its outer case 150b whilst reverse movement Rv of the lever 95 pushes the inner member 150a relative to the outer member 150b all with respect to a neutral position of the lever 95. Similarly, the inner member 151a of the other cable 151 is connected to the member 95 so that movement of the lever 95 to the left, L, from a neutral position pulls the inner member 151a out of its outer member 151b whilst movement of the member 95 to the right R, pushes the inner member 151a into its outer member 151b.

The outer members 150b and 151b of the cables 150, 151 are anchored, at their ends adjacent the member 95 to a fixed part 152 of the body 11.

At its other end the outer member 150b is anchored to a fixed part 153 of the transmission 21 whilst the inner member 150a at this other end is pivotally connected to a parallelogram linkage 154 at point A.

The outer part 151b of the cable 151 is anchored at its other end to the parallelogram linkage 154 at point B whilst the inner member 151a at this other end is anchored to the linkage at point A.

The linkage comprises four equal-length links 155–158. The links 155 and 156 are connected together at their one ends and to the inner members 151a, 150a at point A. At its other end link 155 is connected to input lever 96 at point C which is also connected to link 158 the other end of which is connected to the outer member 151b at point B and also connected, at this point, to link 157 the other end of which is connected to input lever 97 at point D to which link 156 is also connected.

In use, movement of the lever 95 in a forward direction, F, will pull the inner member 150a through the outer member 150b so as to cause the point A of the linkage to move up right in FIG. 10 and hence to cause both input levers 96, 97 to rotate clockwise to cause both pumps to cause forward drive of their associated propulsion means. Movement of the lever 95 from the neutral position in the rearward direction Rv will cause movement of the point A down in FIG. 10 and hence anti-clockwise movement of the input members 93, 94. Movement of the lever 95 to the right, R, will cause movement of inner member 151a to move the point A to the left to cause the input levers 96, 97 to rotate in opposite directions so that the points C and D approach and hence so that input member 93 rotates clockwise to cause forward driving movement of the left-hand propulsion unit, whilst the input member 94 rotates anti-clockwise to cause reverse movement of the right-hand propulsion unit.

When the member 95 is moved to the left, L, from a neutral position then the member 151a will be moved to move the point A to the right so that the input levers 96, 97 will rotate in opposite directions away from each other so that input member 93 is caused to rotate anti-clockwise to give reverse drive at the left-hand propulsion unit whilst the input member 94 is caused to rotate clockwise to give forward drive to the right-hand propulsion unit.

When the lever 95 is moved to a position at 45° to any of the orthogonal positions described hereinbefore, for example 45° to the right between the forward and right positions, the linkage will move such that the operating lever 97 of the pump to the right-hand propulsion unit will remain in its neutral position shown in FIG. 10 whilst the operating lever 96 to the left-hand pump will be moved to its forward position and a similar combination of motions to achieve the regime shown in FIG. 6 will be achieved for other directions of movement of the lever 95 in an analogous manner to the motions described hereinbefore in connection with the other mechanical linkage and hydraulic linkage.

Motor and Stub Axle Mounting

The side members 18, 19 each comprise a loop case compartment and as best shown in FIG. 4 each comprise a transversely inner wall 160 and a transversely outer wall 161 which are joined by top and bottom walls 162, 163 and end walls 164, which provide an oil tight compartment.

It will be seen that the outer walls 161 provide main chassis members of the vehicle body and that at the rear of the vehicle extensions of the outer walls provide the inner side plate of the upstanding members 26, 27. In addition, a transversely extending member 165 interconnects the main chassis members 161 together and provides a floor to the body.

The loop case compartments 18, 19 have mounted thereon, at the positions shown in FIG. 2, the ground engageable propulsion wheels 15, 16 and the motors 92.

Figure 11:
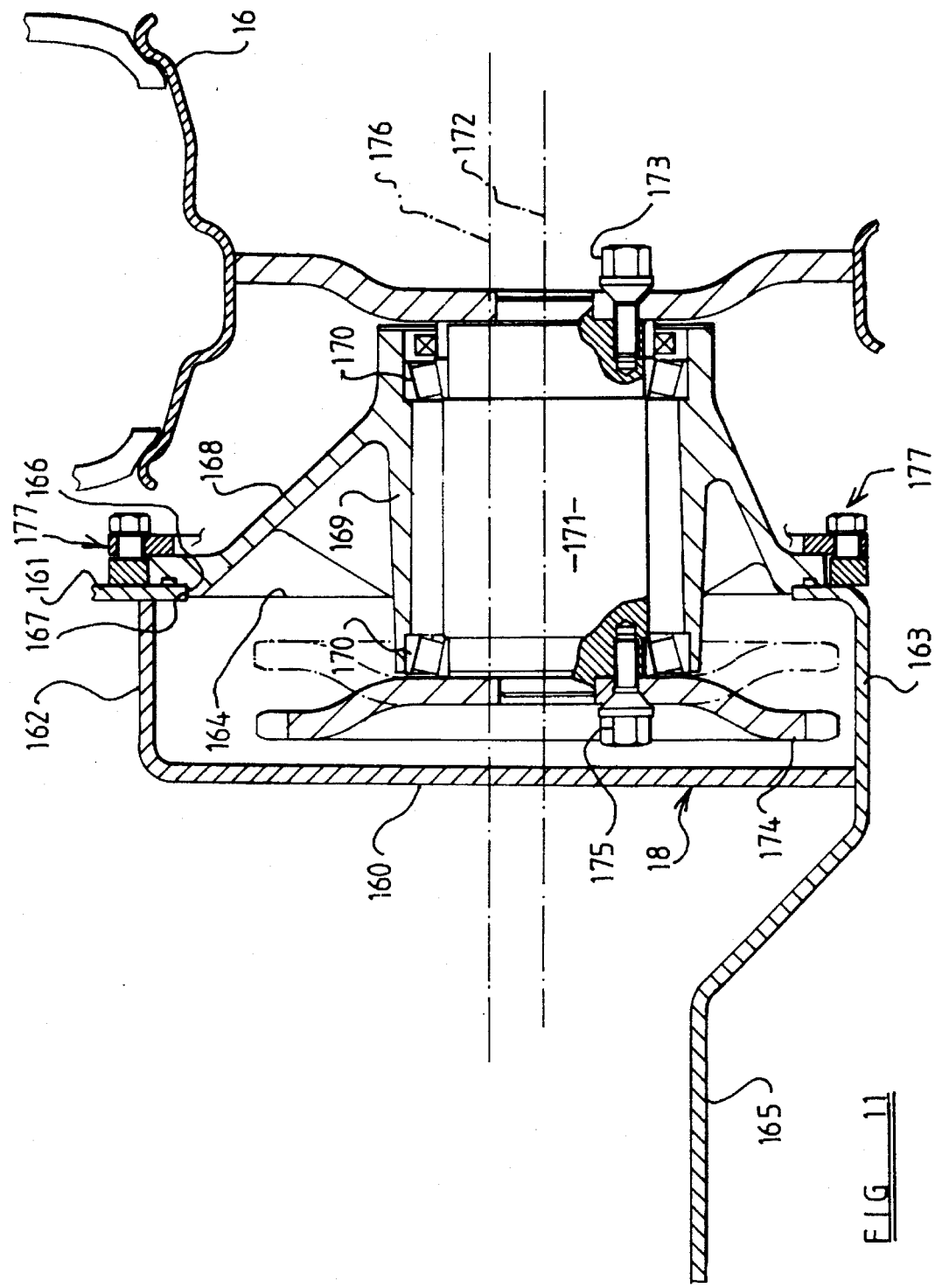
FIG. 11 is a fragmentary transverse cross-section, to an enlarged scale, to the vehicle of FIG. 1 showing a stub axle housing assembly.

Referring now particularly to FIG. 11, there is illustrated the mounting of one of the ground propulsion wheels 16 on the loop case compartment 18 although it should be appreciated that each of the four wheels is mounted on its associated loop case compartment in exactly the same manner and do not require separate description.

At the location of the wheel 16 the outer wall 161 is provided with a circular opening 166 which provides a first guide means which co-operates with a second guide means provided by a rebate 167 of a carrier member 168 of generally frusto-conical configuration and formed integrally with a stub axle housing member 169. The stub axle housing member 169 carries taper roller bearings 170 so that a stub axle 171 is housed by the member 169 so as to be rotatable about an axis of rotation 172.

The wheel 16 is bolted to one end of the stub axle 171 in conventional manner by bolts 173 whilst a driven wheel in the form of a sprocket 174 is bolted to the other end of the stub axle 171 by bolts 175.

The stub axle and its housing, together with the carrier member 168 are configured so that the sprocket 174 is disposed within the loop case compartment 18. The teeth of the sprocket 174 are offset from a central mounting part of the sprocket so that the sprocket can be fastened to the stub axle 171 in a reverse orientation, shown in dotted line in FIG. 11, when attached to the stub axle for the other wheel on the same side of the vehicle.

The carrier member 168 is formed so that the axis of rotation 172 of the stub axle 171 is eccentrically disposed relative to the central axis of the rebate 167 and hence relative to a reference axis 176 about which the carrier member 168 is constrained to rotate by co-operation between the hereinbefore mentioned guide surfaces 166, 167.

Clamping means, such as an annular ring 177, are provided to enable the carrier member 168 to be clamped to the outer wall 161 in any desired angular orientation around the reference axis 176.

By the above described eccentric disposition of the axis 172 relative to the axis 176, the position of the axis 172 both longitudinally and vertically of the vehicle can be adjusted thereby permitting of adjustment of the wheel base of the vehicle, in association with driving chains of appropriate lengths, as well as permitting of adjustment of the ground clearance of the vehicle together with providing a facility for tensioning a chain of a given length.

It will be seen that the stub axle 171 is supported solely from the side wall 161 without any support being afforded by the inner wall 160 thereby avoiding the need to effect any machining operations on the wall 160 which would otherwise be necessary if the stub axle were additionally supported thereby.

In addition, a clearance is provided between the sprocket member 174 and the wall 160 to permit of manipulation of a chain through the space and hence into driving relationship with the teeth of the sprocket 174.

Figure 12:
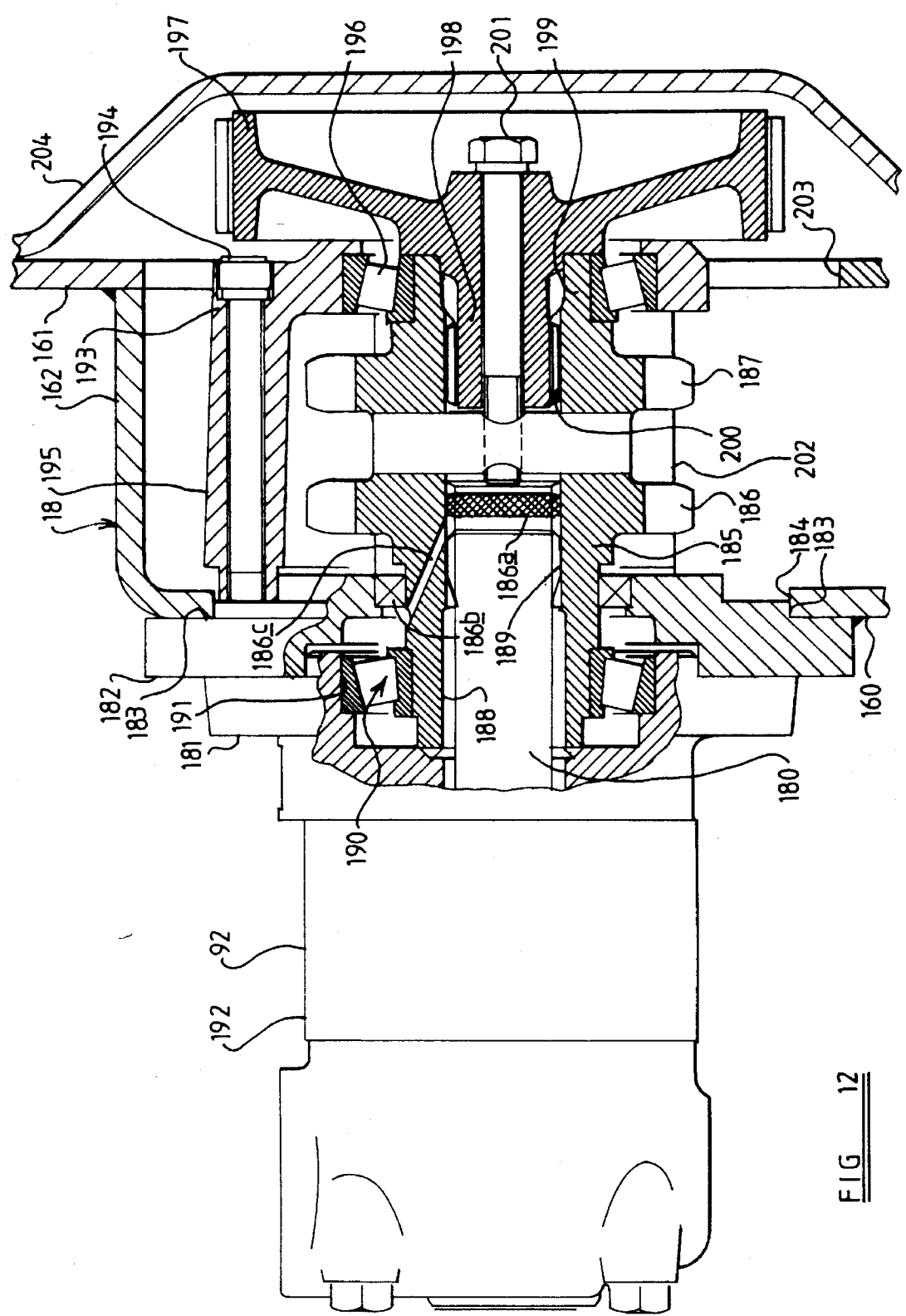
FIG. 12 is a fragmentary transverse cross-sectional view, to an enlarged scale, to the vehicle of FIG. 1 showing a motor assembly.

Referring now to FIG. 12, there is shown the mounting of a motor 92 on the loop case compartment 18.

The motor 92 is a conventional commercially available high torque motor and has a conventional output shaft 180. The motor 92 has a mounting flange 181 by which it is bolted to a mounting plate 182 welded to the inner wall 160 of the compartment 18. The mounting plate 182 has a rebate 183 which is received within a circular aperture 184 formed in the wall 160 to aid location of the ring 182.

A sleeve 185 is machined to provide a pair of driving wheels in the form of sprockets 186, 187 and an inner part 188 of the central passage of the sleeve 185 has the output shaft 180 received therein with a splined connection 189 provided therebetween.

A seal 186a is provided in the central passage and a shaft seal 186b is also provided so that lubricating oil for the splined connection 189 supplied from the motor 92 is caused to flow via bore 186c to lubricate the bearing 190 before returning to the motor.

A taper roller bearing 190 is provided between the external surface of the sleeve 188 and a seat 191 provided by the body 192 of the motor 92.

A bracket member 193 in the form of a three-legged spider is bolted to the pump body 192 by bolts 194, only one leg 195 and one bolt 194 being shown in FIG. 12, the other two legs and bolts being equally angularly disposed around the axis of rotation of the output shaft 180. A further taper roller bearing 196 is provided between the bracket 193 and an outer surface part of the sleeve 185.

A brake drum 197 is formed with a boss 198 which is received within an outer part 199 of the central passage of the sleeve 185 and is retained in splined engagement therewith, as shown at 200 by a bolt 201. The sleeve is provided with a transversely extending passage 202 to receive a locking pin for the bolt 201.

Chains, such as roller chains, not shown, are looped around the respective sprockets 186, 187 and the respective driven sprockets 174 and the sprocket, not shown, of the other wheel.

To assemble the sprocket and chain drive, initially the chains are manoeuvred into the compartment 18 through an opening 203 provided in the outer wall 161 and are passed between the inner wall 160 of the compartment 18 and the respective driven sprocket such as the sprocket 174. At this stage, although the motor 92 is bolted in position, the sleeve 185 and bracket 195 are absent.

The sleeve 185 is then offered up the outward shaft 180 and the chains are then manoeuvred over the outer end of the sleeve 185 and into position on their associated sprockets 186, 187. The hereinbefore described eccentric mounting of the stub axles permits the stub axle axes 172 to be moved towards the motor 92 to provide sufficient slack in the chain for the above manipulation to occur.

The bracket member 195 is then bolted in position with the chains passing through the spaces between the legs 195 thereof. Thereafter the brake drum 197 is bolted in position and finally an extension housing enclosure member 204 is bolted in fluid tight relationship to the outer wall 161.

In the assembly described with reference to FIG. 12, the output shaft 180 and the associated driving sprockets 186, 187 and brake drum 197 are supported entirely from the motor through the bracket 195 and receive no support from any component which is independent of the motor and in particular do not receive any support from the outer member 161. It is therefore unnecessary to perform any machining operation on the member 161 other than the simple formation of the clearance opening 203 which may be made, for example, by flame cutting.

If desired, the motor described above may be mounted on the outer wall 161 instead of the inner wall.

Instead of driving the stub axles from a shaft motor through loops, if desired, the stub axles may be driven by other means such as, by providing a separate motor which may drive each stub axle directly. In this case, if desired the above described eccentric mounting may also be provided with the motor similarly moving eccentrically with the stub axle.

Operator Restraint

Figure 15:
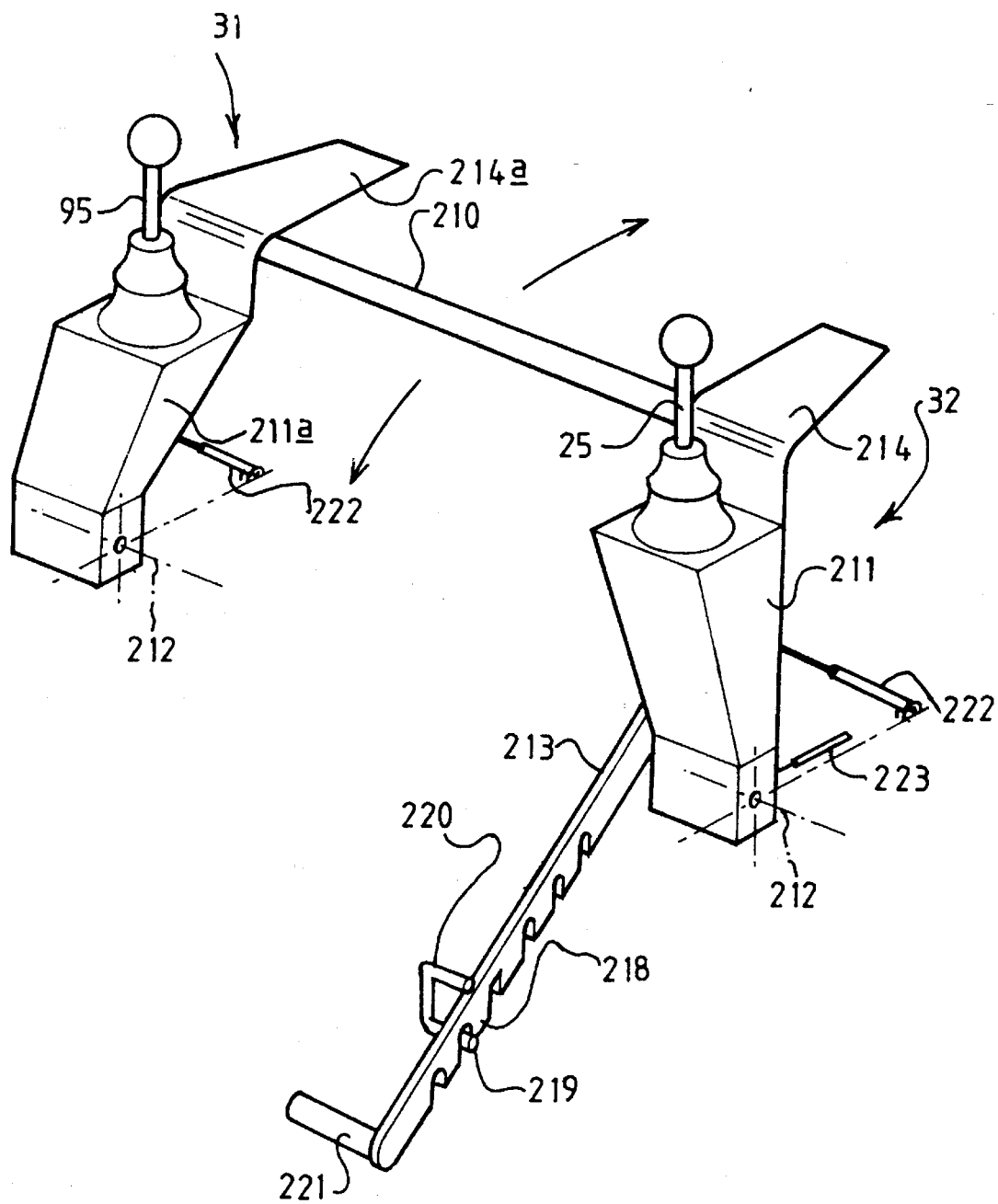
FIG. 15 is a diagrammatic perspective view showing an alternative, and preferred operator restraint to that shown in FIGS. 13 and 14.

Referring now to FIGS. 13–15, a restraint member 210 is provided which is mounted on the body by a lever 211 for movement between operative and inoperative positions. The operative position is shown in FIG. 13 and in this position the member extends transversely of the operator's compartment 22 in restraining relationship with the seat 23 so as to restrain an operator seated on the seat accidentally falling forwards should, for example, the vehicle come to a sudden halt or tip forwardly. The inoperative position is shown in FIG. 14 in which the lever 211 has moved from the generally upwardly position it occupies when the restraint member 210 is in its operative position to a generally forwardly extending position so that the restraint 210 and lever 211 are disposed so as to permit of passage of an operator into and out of the seat 23 through the access opening 33.

The lever 211 is pivoted to the body 11 by suitable pivot means, about an axis 212 which extends transversely of the vehicle. A rigid strut 213 is pivotally connected to the lever 211 at one end and is provided with a ratchet which may engage a ratchet member to lock the lever 211 in its operative position, as hereinafter to be described in more detail with reference to FIG. 15.

In the embodiment illustrated in FIGS. 13 and 14 restraint member 210 extends in cantilever from the lever 211. The lever 211 also carries an arm rest element 214 which pivots with the lever 211 and restraint 210. On the opposite side of the operator's compartment hereinbefore referred to as the "one" side 31 a fixed arm rest element 215 is provided which is fixed relative to the seat 23 and the restraint 210 has a rearwardly directed part 216 which co-operates with the fixed arm rest element 215 so as to fully restrain the operator.

In the embodiment shown in FIGS. 13 and 14 the propulsion control member 95 of the hereinbefore described mechanical rigid linkage is provided and hence is mounted on a fixed part of the body 11 and so, as shown in FIG. 14, does not move with the lever 211 but as it is disposed on said one side 31 of the body it does not interfere with access of an operator through the access opening 33 on said other side 32 of the body.

Also provided on said one side of the compartment mounted on a fixed part of the body is a speed control 217 for the engine.

The lever 211 carries the manually operable loader control 25 which operates the valve means as described hereinbefore, the valve means being connected to the lift and implement operating rams by flexible hydraulic pipes which pass down the lever 211 and exit therefrom adjacent its lower end and pass to their associated rams. The flexible pipes, of course, permit of the hereinbefore described pivotal movement of the lever 211.

Referring now to FIG. 15 which shows a modification of the restraint shown in FIGS. 13 and 14. In this modification the restraint 210 is supported not only by a lever corresponding with the lever 211 described hereinbefore but, in addition, at the opposite end thereof by a second similar lever 211a which is pivotally mounted about the same axis 212 as the lever 211 and which carries a further arm rest element 214a. As shown in FIG. 15 the rigid strut 213 is provided with ratchet teeth 218 which co-operate with a ratchet member 219 which is provided with a co-operating guide 220 to constrain the link 213 from excessive pivotal movement away from the ratchet 219. In addition the link 213 has a transversely extending lug 221 at its lower end which can be engaged by a foot of the operator to enable him to pivot the link 213 upwardly out of engagement with the ratchet 219 to permit of movement of the restraint from an operative to an inoperative position. Alternatively a ratchet mechanism operated by a trigger or other manually operable mechanism on or adjacent the restraint may be provided. Such movement is aided by providing gas springs 222 of conventional type.

The lever 21 la carries the propulsion control member 95 of the kind used when the linkage is the hydraulic or flexible mechanical linkage described hereinbefore. In either case the flexible hydraulic pipes or mechanical push-pull cables permit of pivotal movement of the lever 211a about the pivot 212.

If desired, the control means 95 may be mounted on a fixed part of the body irrespective of the linkage and the restraint 210 may be in that case supported by either a single lever as shown in FIGS. 13 and 14 or by two levers as shown in FIG. 15.

The link 213 and gas springs 222 described and illustrated with reference to FIG. 15 also provided in the embodiment shown in FIGS. 13 and 14.

In addition, in both embodiments a flexible cable or rigid mechanical link is provided between the or at least one of the levers 211 and a parking brake of the vehicle. Such a link is shown at 223 in FIGS. 13 and 15.

Although in the illustrated examples the propulsion control lever 95 has been described as being on said one side 31 of the operator's compartment whilst the loader control means 25 has been disposed on said other side 32, if desired the location of the said controls can be transposed consistent with the linkage from the propulsion control being capable of accommodating pivotal movement of the lever 211.

In use, the link 223 ensures that the vehicle parking brake is off when the restraint 210 is in its operative position and is applied when the restraint 210 is in its inoperative position. In addition an interlock to the engine is provided, not shown, which with the restraint 210 in its operative position enables the engine to be continued to run and also enables the engine to be started but, in each case, only if an operator is sitting on the seat since an additional interlock is provided sensitive to the presence or absence of an operator.

When the restraint 210 is moved to an intermediate position from its operative position the interlock senses this and causes the engine to be immobilised.

When the restraint 210 is in its inoperative position the interlock permits the engine to be started and in this case the engine can be started even if an operator is not in the seat but only if the parking brake is applied by virtue of the link 223.

The ratchet teeth 218 are positioned and provided so as to permit of adjustment of the restraint 210 when in an operative range of positions to suit different sizes of driver.

Operator's Compartment

The operator's compartment 22 is defined in part by the inner plates 26a, 27a of the upstanding members 26, 27, the roof 28 and the posts 29 which together provide the enclosure with one side, 31 and a top and rear wall which include means for preventing access therethrough. In the case of the one side 31 this is by virtue of the presence of the boom assembly and also the wire mesh protective screen 30. At the rear, the operator's compartment is defined in part by the front wall 34b of the engine compartment 34. The space between the top wall 34b and the underside of the pivot member 42 whilst preventing access to the operator's compartment does permit the operator to look out of the compartment to the rear beneath the pivot member 42.

The inner plates 26a, 27a which in substance define part of the operator's compartment are themselves integral continuations of the outer walls 161 of the hereinbefore described side members 18, 19. In the present example the inner plates 26a, 27a, and a contoured base 28a are made by bending a single plate to the profile shown in FIG. 4. The roof 28 is welded to the plates 26a, 27a. If desired the operator's compartment may be integrated with other structural members of the body by welding instead of being formed from a single plate.

Thus it will be seen that the main structural parts of the operator's compartment which provide the wall thereof are formed integrally with other structural elements of the vehicle and in particular the side members 18, 19 which provide the loop cases and the upstanding members 26, 27 which carry the boom assembly pivots and thus the operator's compartment is integrated with the remainder of the machine and hence has a high ability to withstand forces exerted thereon during roll-over conditions.

Further Embodiment

Referring now to FIGS. 16 to 20 of the drawings, a skid steer loader vehicle 310 comprises a body 311 having a front end 312 and a rear end 313. The body 311 is provided with ground engageable propulsion means 314 comprising a pair of front wheels 315 disposed forwardly of a pair of rear wheels 316. The vehicle 310 is propelled in a straight line forwardly or rearwardly by driving all four wheels or, to steer the vehicle, by driving the wheels 315 and 316 on one side at a different speed and/or direction than those on the other side. Such skid steer loaders have a high degree of manoeuvrability and to facilitate skid steering and in particular, for example, the ability of the vehicle to turn about a central axis of the ground engageable propulsion means the wheel base is made, in the present example, slightly shorter than the track of the vehicle although, if desired, the wheel base may be the same or longer than the track if desired.

The wheels 315, 316 are carried on stub axles 317 which project outwardly from a pair of transversely spaced side members 318 of the body 310 and which extend fore and aft of the vehicle. Between the side members 318 is a transmission compartment which houses a transmission, whilst above and forwardly of the transmission compartment is an operator's compartment 322 in which is provided an operator's seat, manually operable propulsion controls for controlling the speed, selecting forward and reverse movement, and steering the vehicle and manually operable loader controls for controlling a loader arm and material handling implement as hereinafter to be described.

The operator's compartment 322 is also defined by a pair of upstanding members 326, 327 which extend upwardly from the side members, 318, 319 on opposite sides of the vehicle and by a roof 328 which extends forwardly and adjacent its forward end is supported by posts 329. If desired the operator's component may be structurally separate from the members 326, 327.

A wire mesh screen 330 is provided on one side 331, of the operator's compartment 322 for protection of an operator, whilst the other side, 332 of the operator's compartment is unobstructed and provides an access opening 333 whereby an operator can enter and leave the operator's compartment 322.

Behind the transmission compartment 320 and operator's compartment 322 is provided an engine compartment 334 in which an engine of any suitable type is housed. In the present example the engine is an air-cooled diesel engine but any other suitable engine may be provided.

The vehicle is provided with a loader arm boom assembly 340 which is disposed adjacent the one side 331 of the operator's compartment 322. The boom assembly 340 comprises a lift arm assembly 341 which has a pivot member 342 projecting from an inner end 343 of the lift arm assembly 341 and extends transversely of the body and is pivotally mounted on the body by means of a torsion member 344.

The torsion member 344 comprises a torsionally rigid beam 345 of welded box-section configuration provided with end plates 346.

The beam 345 has an inclined surface portion 345a in the way of the lift arm assembly 341 so as to permit the lift arm assembly 341 to pivot to its lowermost position.

Figure 18:
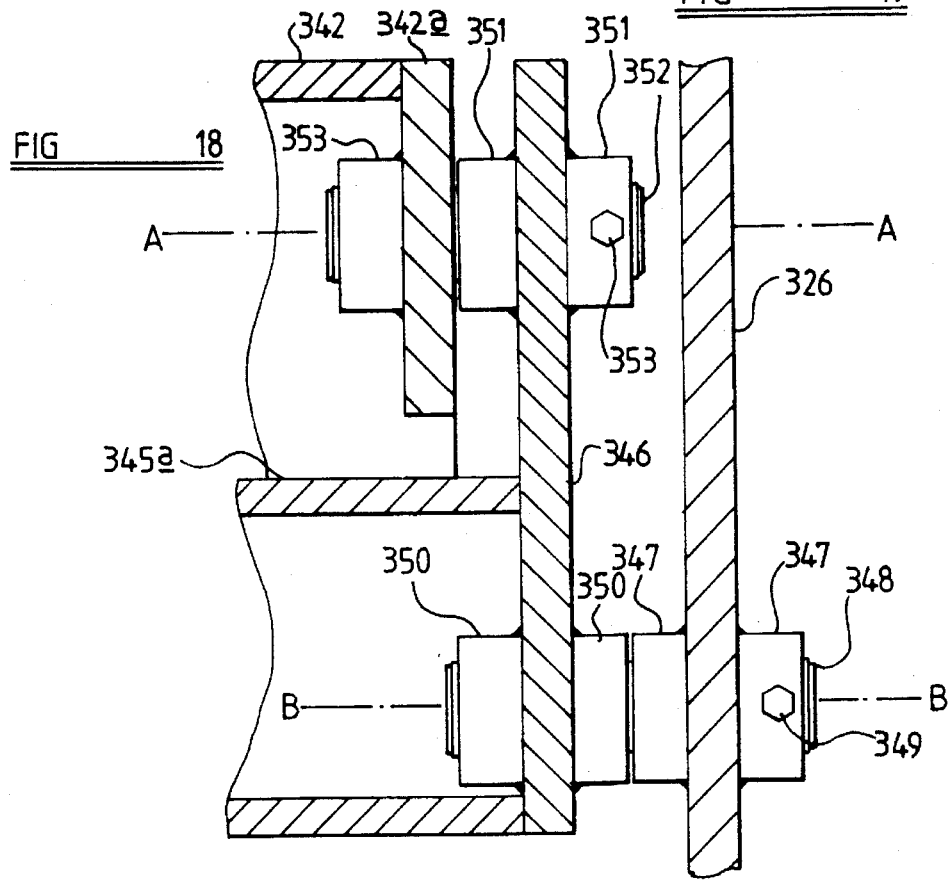
FIG. 18 is a section on the line 3—3 of FIG. 2.
Figure 20:
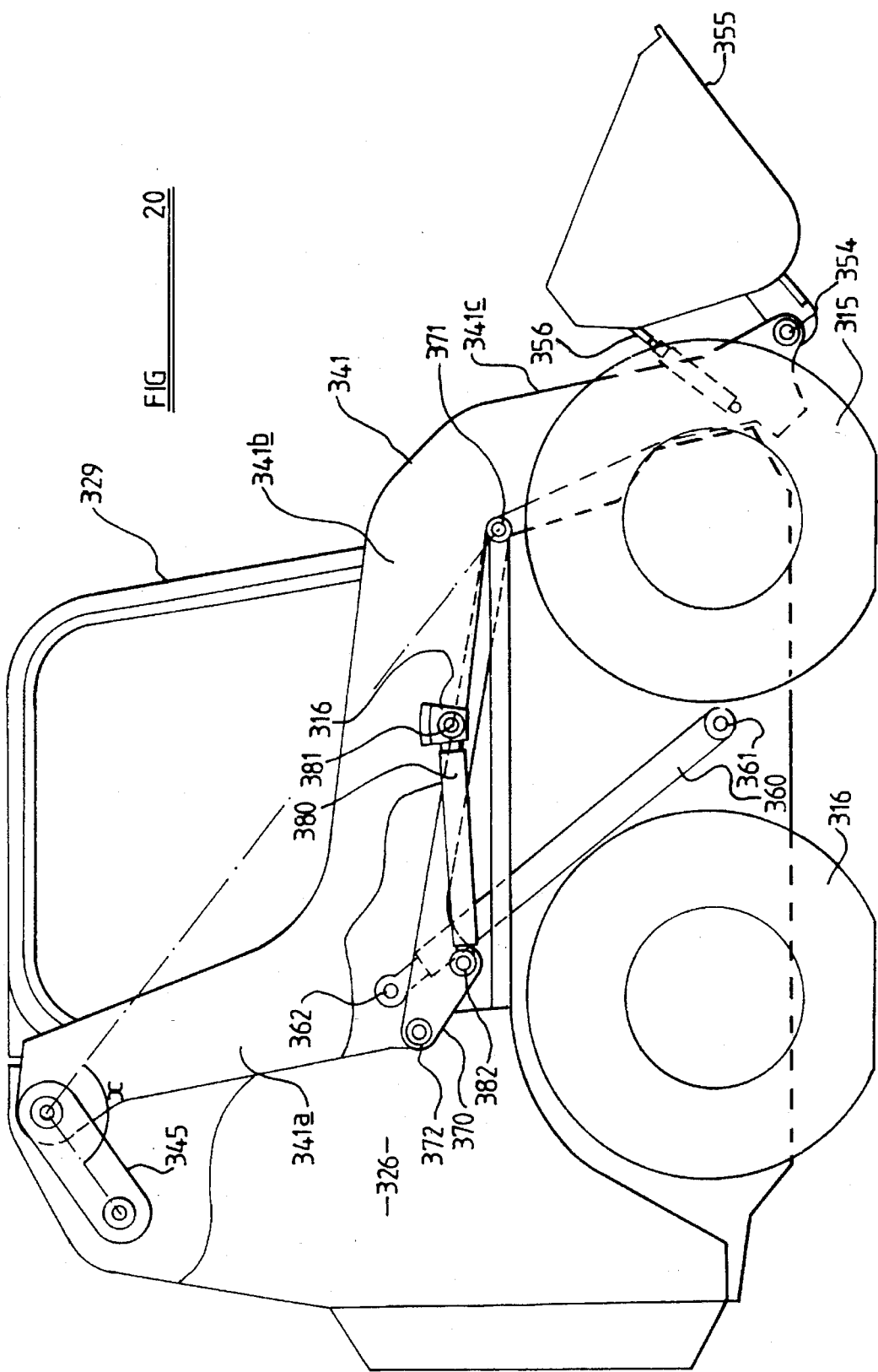
FIG. 20 is a side elevation of the vehicle of FIG. 1 to an enlarged scale showing the boom assembly in a lowered position.

As shown in FIG. 18, the upstanding members 326, 327 have a boss 347 welded on opposite sides thereof and a pivot pin 348 is received within the bosses 347 and prevented from rotation relative thereto by a locking bolt 349 which passes through the pin 348 and is threadedly received adjacent its free end in a threaded opening in the boss 349. The pin 348 projects inwardly of the respective plates 326, 327 and is received within a pair of bosses 350 welded to the respective side plate 346 of the torsion member 345, the bosses 350 and the side plate 346 being provide with an appropriate aperture so as to pivotally receive the pivot pin 348 therein.

The respective side plates 346 are provided with a further pair of bosses 351 in which a further pivot pin 352 is non-rotatably received, again being locked with a locking bolt 353. The pin 352 projects through an aperture in an end plate 342a of the pivot member 342 and into an aperture provided in a boss 353 welded to the inner side thereof so as to be pivotally received therein.

Consequently the lift arm assembly 341 is pivotally mounted for movement about a first axis A—A relative to the torsion member 345 whilst the torsion member 345 is pivotally mounted about an axis B—B relative to the body. The axes A—A and B—B are parallel and extend transversely of the body perpendicular to a fore and aft axis of the body.

As can be seen from FIG. 16 the axis B—B is disposed at the upper ends of the uprights 326 and are therefore disposed adjacent the upper end of the operator's compartment 322.

The loader arm assembly 341 has three parts which, when the loader arm assembly 341 is in its lowermost position, shown in FIG. 2, has a first part 341a which extends substantially downwardly from the first pivot axis A—A, although with a minor forward component, a second part 341b which extends forwardly, although with a small downward component, from the lower end of the part 341a, and a third part 341c which extends substantially downwardly, although with a small forward component, from the forward end of the part 341b. The third part 341c is provided with pivot means 354 to mount a material handling implement, which in this case is an excavator bucket 355 but which may be any other material handling equipment such as forks, on the front end of the lift arm assembly. Crowd ram means 356 are provided to cause crowd movement of the implement 355 about a horizontal axis 356.

It will be noted that the distance between the axes A—A and B—B is substantially smaller than the overall length of the lift arm assembly 341c.

A lifting means comprising a hydraulic lifting ram 360 is pivotally connected at one end to the body 310 at a position 361 which is disposed between the wheels 315, 316 and adjacent a plane containing their axes of pivot. The ram 360 extends upwardly and rearwardly from the first end connected to the body at 361 and is connected at a second end to the lift arm assembly 341 adjacent the junction of the first and second parts 341a and 341b, as shown at 362. As shown in FIG. 2, the lifting means 360 extends upwardly and rearwardly from the pivotal connection 361 in all positions on the lift arm assembly.

A guide link 370 is pivotally connected at its forward end to the body 310, as shown at 371, at a position which is adjacent the forward end of the body and closely spaced above the top of the ground engageable propulsion means 314. The guide link 370 extends rearwardly from the position 371 and is connected at its rearward or second end to the lift arm assembly 341, as shown at 372, again at the junction between the first and second parts 341a and 341b.

An implement levelling ram means 380 is pivotally connected at its forward end to the link arm assembly 341, as shown at 381, and extends rearwardly, substantially horizontally but slightly inclined downwardly so as to be connected to the guide link 370 at a position shown at 382. The implement levelling ram means 380 is hydraulically connected to the crowd ram means 356 to displace hydraulic fluid between the levelling ram means 380 and the crowd ram means 356 so as to maintain the implement 355 in a constant orientation relative to the ground as the lift arm assembly is raised and lowered.

Figure 19:
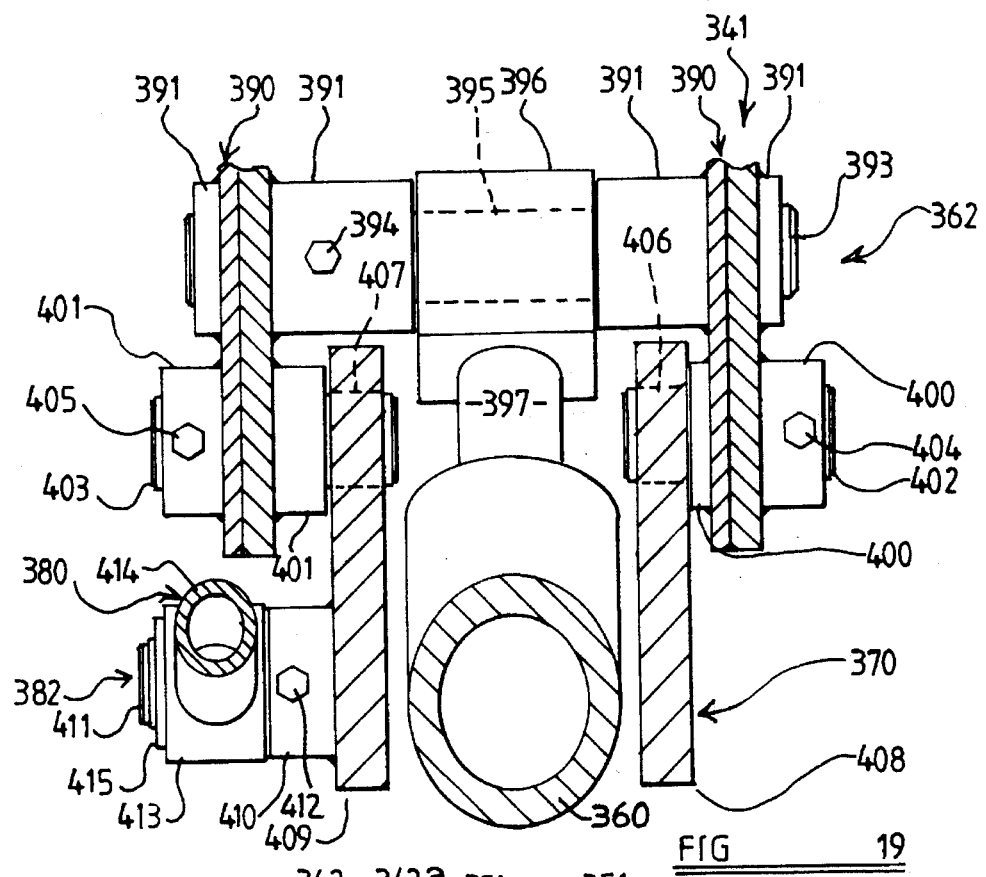
FIG. 19 is a section on the line 4—4 of FIG. 2.

Referring now to FIG. 19, the lift arm assembly 341 in the region of the junction between parts 341a and 341b comprises spaced parallel side plates 390 to which bosses 391 are welded and which receive a pivot pin 393. The pivot pin 393 is prevented from rotation relative to the bosses 391 by a locking screw 394 which passes through a transverse passage in the pin 393 and which at its free end is received in a threaded opening in the respective boss 391. The pivot pin 393 is received in a passage 395 provided in a mounting block 396 fixed to the ram 397 of the lifting ram 360 so as to provide the hereinbefore mentioned pivotal connection 362 between the ram 360 and the lift arm assembly 341.

Also welded to the side plates 390 are further bosses 400, 401. Each pair of bosses 400, 401 receive therein a pivot pin 402, 403 respectively, the pivot pins being retained from rotation relative to the bosses 400, 401 by locking screws 404, 405 similar to the locking screw 394. The pivot pins 402, 403 are pivotally received in apertures 406, 407 respectively in guide link elements 408, 409 which extend parallel to each other and which together comprise the guide link 370 described hereinbefore. As shown in FIG. 19, the ram 360 extends between the link elements 408, 409.

The outer link element 409 is provided with a boss 410 which has a pivot pin 411 locked therein by a locking screw 412 similar to the locking screw 394. The pivot pin 411 pivotally mounts a mounting block 413 provided on the ram 414 of the levelling ram 380 and thus provides pivotal connection 382 thereof to the guide link 370, the mounting block 413 being retained on the pin 411 by a circlip 415. At its other end the levelling ram 380 is pivotally connected to the lift arm assembly 341 by a pivot pin extending between bosses provided on the outer side plate of the lift arm assembly 341 and a bracket 416 welded thereto, in a similar manner to the bosses described hereinbefore.

In use, when the ram 360 is pressurised in conventional manner from the usual hydraulic supply of the vehicle, the lift arm assembly 341 is raised at its outer end and, as shown in FIG. 2, the path of travel is substantially vertical throughout the range of movement.

It will be noted that the guide link 307 extends generally horizontally from its pivotal connection 371 when the boom is in the lowered position shown in FIG. 2.

During an initial position of the range of movement, i.e. from the lowermost position shown in FIG. 2 to the intermediate position shown in FIG. 2, the pivotal connection 372 will move upwardly and rearwardly which will cause the torsion member 345 to pivot rearwardly, i.e. in an anti-clockwise direction in FIG. 2, so that an included angle X in a line joining the first and second axes of pivot and a line joining the first axis of pivot A—A and the pivotal connection 354 of the implement to the assembly 341 decreases. As a result of the rearward movement of the torsion member 345 the path of movement of the pivotal connection 354 is displaced rearwardly from the position it would otherwise follow, which is shown at P in FIG. 17.

As the loader arm assembly moves further upwardly into a second part of the range, so that the position of pivotal connection 372 of the guide link 370 to the lift arm assembly 341 passes through a line joining the first pivot axis A—A and the axis of pivotal connection 371 of the guide link to the body the torsion member 345 is caused to pivot forwardly, i.e. in a clockwise direction in FIG. 17, and the above mentioned included angle X increases. Of course, the lowering movement of the lift arm assembly is the reverse of that described hereinbefore. By appropriate selection of the parameters of the hereinbefore described components and their relative positioning, the connecting means 354 can be caused to move in the above described substantially vertical path, shown at I in FIG. 2, although variations from this path can be achieved as desired by appropriate selection of the above mentioned parameters.

In addition, as the lift arm assembly is raised and lowered as described hereinbefore, the piston rod of the levelling ram 380 is moved relative to its cylinder to displace hydraulic fluid between it and the crowd ram 356 so as to cause the crowd ram to operate to maintain the implement 355 in a fixed orientation relative to the ground during the range of movement of the lift arm assembly.

From the foregoing it will be seen that boom assembly 340 extends forwardly from a position adjacent the rear end of the body 311 alongside the one side 331 of the operator's compartment 322 whilst the other side 332 is unobstructed so that an operator can gain access to the compartment through the access opening 333.

By providing the axis of pivot of the lift arm assembly 341 adjacent the top rear corner of the operator's compartment the operator is provided with the ability to lift the bucket to a relatively great height and at the same time provide the bucket with good reach and the vehicle with a stability. For example, the axis of pivot of the lift arm assembly is approximately 1.5 m above the ground in the example illustrated, whilst the distance between the axis of pivot of the lift arm assembly and the axis of pivot of the bucket about the axle 375 is approximately 2.5 m. Hence the vehicle has a total lift of approximately 3 m and over the whole of this range of lift the pivotal connection 375 to the bucket lies forwardly of the front end 312 of the vehicle.

The operator's compartment 322 is defined in part by inner plates 326a, 327a of the upstanding members 326, 327, the roof 328 and the posts 329 which together provide the enclosure with one side, 331 and a top and rear wall which include means for preventing access therethrough. In the case of the one side 331 this is by virtue of the presence of the boom assembly and also the wire mesh protective screen 330. At the rear, the operator's compartment is defined in part by the front wall 334a of the engine compartment 334. The space between the front wall 334a and the underside of the torsion member 344 whilst preventing access to the operator's compartment does permit the operator to look out of the compartment to the rear beneath the torsion member 344.

The inner plates 326a, 327a which in substance define part of the operator's compartment are themselves integral continuations of the outer walls of the hereinbefore described side members 318, 319.

Thus it will be seen that the main structural parts of the operator's compartment which provide the wall thereof are formed integrally with other structural elements of the vehicle and in particular the side members 318, 319 and the upstanding members 326, 327 which carry the boom assembly pivots and thus the operator's compartment is integrated with the remainder of the machine and hence has a high ability to withstand forces exerted thereon during roll-over conditions.

The vehicle shown in FIGS. 16 to 20 may incorporate any of the features described hereinbefore with reference to FIGS. 1 to 15 mutatis mutandis.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

We claim:

1. A loader vehicle comprising a body having a front end and a rear end and provided with ground engageable propulsion means, an operator's compartment and a boom assembly, said boom assembly, comprising a lift arm assembly and a pivot member which projects transversely from an inner end of the lift arm assembly on one side thereof and extends transversely across the body from said one side of the lift arm assembly and which is pivotally mounted on the body, adjacent the rear end thereof, for movement of the lift arm assembly between a raised position and a lowered position in which the lift arm assembly extends forwardly alongside the operator's compartment and means carrying a material handling implement at an outer end of the boom assembly so as to be disposed forward of the front end of the body, wherein the pivot member is pivotally mounted, for movement about a first axis, on a torsion member, which extends transversely across the body, by first pivotal mounting means disposed at positions which are spaced apart transversely of the torsion member and the torsion member is pivotally mounted on the body, for movement about a second axis which is parallel to the first axis and which extends transversely of the body, by second pivotal mounting means disposed at positions which are spaced apart transversely of the body.

2. A vehicle according to claim 1 wherein the boom assembly comprises a unitary generally L-shaped member comprising the lift arm assembly and the pivot member which projects from the inner end of the lift arm assembly on one side thereof and extends transversely across the body on said one side of the lift arm assembly to a position adjacent the opposite side of the body.

3. A vehicle according to claim 1 wherein the torsion member is pivotally mounted on the body by pivotal mounting means disposed at fixed positions which are spaced apart transversely of the body and are adjacent an upper rear end part of the body and are on opposite sides of the body.

4. A vehicle according to claim 1 wherein the distance between the first and second axes of pivot is substantially shorter than the length of the lift arm assembly.

5. A vehicle according to claim 1 wherein a lifting means is connected at one end to the body at a position between a forward end and a rearward end of the ground engageable propulsion means and at its other end to the lift arm assembly at a position intermediate a forward end thereof and the pivot member so as to extend upwardly and rearwardly from the body to the lift arm assembly at least when the lift arm assembly is in a lowered position.

6. A vehicle according to claim 1 wherein a guide link is connected between the body and the lift arm assembly to constrain the forward end of the lift arm assembly to move in a predetermined path that may be substantially vertical as the forward end is moved between a lowered and a raised position.

7. A vehicle according to claim 6 wherein the guide link has one end pivotally connected to the body adjacent the forward end of the body at a position which is below the position which the torsion member is pivotally mounted on the body and a second end disposed rearwardly of the first end and pivotally connected to the lift arm assembly at a position between the forward end and the pivot member.

8. A vehicle according to claim 6 wherein a lifting means is connected at one end to the body at a position between a forward end and a rearward end of the ground engageable propulsion means and at its other end to the lift arm assembly at a position intermediate a forward end thereof and the pivot member so as to extend upward and rearwardly from the body to the lift arm assembly at least when the lift arm assembly is in a lowered position and the guide link is pivotally mounted on the body at a position above the position of connection of the lifting means to the body.

9. A vehicle according to claim 6 wherein widen the lift arm assembly is in a lowered position the guide link is disposed wholly below the position of said second pivotal mounting means of the torsion member to the body.

10. A vehicle according to claim 6 wherein a lifting means is connected at one end to the body at a position between a forward end and a rearward end of the ground engageable propulsion means and at its other end to the lift arm assembly at a position intermediate a forward end thereof and the pivot member so as to extend upwardly and rearwardly from the body to the lift arm assembly at least when the lift arm assembly is in a lowered position and the pivotal connection of the lifting means to the body is disposed at a position which is between forward and rearward ends of the guide link widen the lift arm assembly is in a lowered position.

11. A vehicle according to claim 6 wherein the guide link is longer than the distance between the axes of pivot of the torsion member to the body and the lift arm assembly to the torsion member.

12. A vehicle according to claim 6 wherein the guide link constrains the torsion member initially to pivot rearwardly as the forward end of the lift arm assembly is raised from a lowered position so that an included angle between a line joining the first and second axes of pivot and a line joining the first axis of pivot and the pivotal connection of the implement to the lift arm assembly decreases as the lift arm assembly is raised over a first portion of its range of movement and the second link then pivots forwardly so that said included angle increases as the lift arm assembly moves over a second portion of said range of movement.

13. A vehicle according to claim 6 wherein the lift arm assembly comprises a first part which extends generally downwardly from the first axis of pivot, a second part which extends forwardly generally horizontally from the lower end of the first part, and a third part which extends downwardly from the forward end of the second part and the guide link is connected to the lift arm assembly in the region where the first and second parts of the lift arm assembly meet.

14. A vehicle according to claim 13 wherein the lifting means is connected to the lift arm assembly in said region.

15. A vehicle according to claim 6 wherein the position of connection of the guide link to the lift arm assembly is disposed below a line joining the position of pivotal connection of the forward end of the guide link to the body and the first pivotal axis when the lift arm assembly is in a lowered position and moves to a position above said line as the lift arm assembly is moved to its uppermost position.

16. A vehicle according to claim 6 wherein the boom assembly comprises an implement levelling ram means having a first end connected to the left arm assembly and extending rearwardly therefrom to have a second end connected of the guide link to the lift at a position adjacent to and spaced from the pivotal connection of the guide link to the lift arm assembly and a crowd ram means operatively connected between the lift arm assembly and said material having implement for crowd movement of said implement relative to said lift arm assembly wherein said implement levelling ram means is hydraulically connected to said crowd ram means to displace hydraulic fluid between said implement levelling ram means and said crowd ram means to maintain the material handling implement in a fixed orientation relative to the body irrespective of raising and lowering of the lift arm assembly.

17. A vehicle according to claim 6 wherein a lifting means is connected one end to the body at a position between a forward end and a rearward end of the ground engageable propulsion means and at its other end to the lift arm assembly at a position intermediate a forward end thereof and the pivot member so as to extend upwardly and rearwardly from the body to the lift arm assembly at least when the lift arm assembly is in a lowered position and the guide link comprises a pair of spaced parallel guide link elements and the lifting means is disposed so as to extend between the elements.

18. A vehicle according to claim 17 wherein the boom assembly comprises an implement levelling ram means having a first end connected to the lift arm assembly and extending rearwardly therefrom to a second end connected to the guide link at a position adjacent to and spaced from the pivotal connection of the guide link to the lift arm assembly and a crowd ram means operatively connected between the lift arm assembly and said material handling implement for crowd movement of said implement relative to said lift arm assembly wherein said implement leveling ram means is hydraulically connected to said crowd ram means to displace hydraulic fluid between said implement levelling ram means and said crowd ram means to maintain the material handling implement in a fixed orientation relative to the body irrespective of raising and lowering of the lift arm assembly and the implement levelling ram means is disposed on the outer side of the lifting means and is pivotally connected to an outer one of said pair of link elements.

19. A vehicle according to claim 1 wherein an access opening to the operator's compartment is provided on the other side of the operator's compartment to that alongside which the lift arm assembly extends and the mounting means and torsion member are disposed on or adjacent a top rear part of the operator's compartment at a level whereby an operator can see horizontally rearwardly beneath the torsion member.

20. A loader vehicle comprising, a body having a front end and a rear end and provided with ground engageable propulsion means, a single operator's compartment provided at a fixed location on the body and comprising an enclosure and a boom assembly which is mounted, at an inner end thereof, on the body, adjacent the rear end thereof, for movement between a raised position and a lowered position in which the boom assembly extends forwardly alongside the operator's compartment and a material handling implement carried on an outer end of the boom assembly is disposed forward of the front end of the body wherein the boom assembly is a generally L-shaped member comprising a lift arm assembly, which extends forwardly along one side only of the operator's compartment and a substantial pivot member which is rigid with the lift arm assembly, which projects from the inner end of the lift arm assembly on one side thereof and extends transversely across the body from said one side of the lift arm assembly to a position adjacent the opposite side of the body, the pivot member being mounted on the body by pivotal mounting means disposed at positions which are spaced apart transversely of the body and are adjacent an upper rear end part of the body and are on opposite sides of the body.

21. A vehicle according to claim 20 wherein said enclosure has one side, a top and a rear wall and another side wall having an access opening and a front wall through which an operator may see, at least part of said walls being integral with other structural elements of the vehicle.

22. A vehicle according to claim 20 wherein the body comprises a pair of transversely spaced side members on which the ground engageable propulsion means are mounted, said mounting means are supported by a pair of transversely spaced upright members disposed adjacent the rear of the body and which extend upwardly from said side members at the rear of, and on opposite sides of the operator's compartment, the mounting means being disposed at a top rear part of the operator's compartment and there being an opening in the compartment below the pivot member whereby an operator can see horizontally rearwardly beneath the pivot member.

23. A vehicle according to claim 22 wherein a lower portion of the operator's compartment is disposed between said side members, a part of said upright members provide a part of side walls of the operator's compartment and a part of the side members and of the upright members are formed integrally with each other and with the top wall of the operator's compartment.

24. A vehicle according to claim 22 wherein the side members comprise loop case compartments comprising a transversely inner wall and a transversely outer wall joined by top and bottom walls and end walls and a member, providing one of said walls, being integral with the member which provides at least part of an upstanding member.

25. A vehicle according to claim 20 wherein an access opening to the operator's compartment is on the other side of the operator's compartment to that alongside which the lift arm assembly extends.

26. A vehicle according to claim 20 wherein the lift arm assembly has an implement carrying member which projects from an outer end of the lift arm assembly and extends transversely in front of the body and has said material handling implement carried thereon.

27. A vehicle according to claim 26 wherein the body is provided with an abutment means provided at the front end of the vehicle and disposed on the opposite side of the vehicle to the side on which the lifting arm assembly is disposed and adapted to engage the implement carrying member to support the implement carrying member against displacement in a direction rearwardly of the vehicle when the boom assembly is in a lower position.

28. A vehicle according to claim 27 wherein said abutment means is adapted to engage a roller rotatably mounted on the implement carrying member and the abutment means comprises an abutment surface having a lower, generally upright part and an upper part which extends forwardly and upwardly.

29. A vehicle according to claim 20 wherein the lift arm assembly comprises a major rectilinearly extending part which extends from the inner end towards the outer end and a minor part which is inclined downwards relative to the major part and is disposed between the major part and said implement carrying member.

30. A vehicle according to claim 20 wherein the ground engageable propulsion means comprises a pair of wheel assemblies disposed on opposite sides of the vehicle and each pair comprising a front wheel disposed forwardly of a rear wheel and means to permit the vehicle to be propelled and steered by driving the wheels on one side of the vehicle at the same or a different speed and/or in a different direction of rotation from those on the other side of the vehicle.

31. A vehicle according to claim 20 wherein the body comprises a pair of transversely spaced side members on which said ground engageable propulsion means are mounted.

32. A vehicle according to claim 31 wherein a lower portion of the operator's compartment is disposed between said side members.

33. A vehicle according to claim 31 wherein the body has a transmission compartment at least a portion of which is disposed between said side members and below the operator's compartment and said transmission compartment housing a transmission to transmit drive from an engine of the vehicle to the ground engageable propulsion means.

34. A vehicle according to claim 33 wherein the body is provided with an engine compartment rearwardly of the operator's compartment and transmission compartment and said engine compartment housing the engine of the vehicle.

35. A vehicle according to claim 31 wherein the mounting means is supported by a pair of transversely spaced upright members disposed adjacent the rear of the body and which extend upwardly from said side members at the rear of the operator's compartment.

* * * * *